(12) United States Patent
Shindo et al.

(10) Patent No.: US 9,855,467 B2
(45) Date of Patent: Jan. 2, 2018

(54) GOLF BALL

(71) Applicant: Dunlop Sports Co., Ltd., Kobe-shi, Hyogo (JP)

(72) Inventors: Ayaka Shindo, Kobe (JP); Chiemi Mikura, Kobe (JP); Ryota Sakamine, Kobe (JP); Sho Goji, Kobe (JP)

(73) Assignee: DUNLOP SPORTS CO. LTD., Kobe-Shi, Hyogo (JP)

(*) Notice: Subject to any disclaimer, the term of this patent is extended or adjusted under 35 U.S.C. 154(b) by 193 days.

(21) Appl. No.: 14/291,229

(22) Filed: May 30, 2014

(65) Prior Publication Data
US 2014/0357407 A1    Dec. 4, 2014

(30) Foreign Application Priority Data

May 31, 2013 (JP) .................................. 2013-115473
Feb. 28, 2014 (JP) .................................. 2014-039187

(51) Int. Cl.
*A63B 37/02* (2006.01)
*A63B 37/04* (2006.01)
(Continued)

(52) U.S. Cl.
CPC ...... *A63B 37/0092* (2013.01); *A63B 37/0051* (2013.01); *A63B 37/0063* (2013.01);
(Continued)

(58) Field of Classification Search
CPC .......... C08K 5/025; C08K 5/09; C08K 5/098; C08K 5/14; A63B 37/0063; A63B 37/0074; A63B 37/0065; A63B 37/0075
See application file for complete search history.

(56) References Cited

U.S. PATENT DOCUMENTS 4,688,801 A * 8/1987 Reiter .................. C08F 279/02
473/372
2002/0042311 A1    4/2002 Watanabe
(Continued)

FOREIGN PATENT DOCUMENTS

JP    2003-164546 A    6/2003
JP    3672016 B2    7/2005
(Continued)

OTHER PUBLICATIONS

Compressions by any other name—J. Dalton.*
(Continued)

*Primary Examiner* — John E Simms, Jr.
(74) *Attorney, Agent, or Firm* — Birch, Stewart, Kolasch & Birch, LLP

(57) ABSTRACT

An object of the present invention is to provide a golf ball showing a great flight distance on driver shots. The present invention provides a golf ball comprising a spherical core and at least one cover layer covering the spherical core, wherein when JIS-C hardness of the spherical core is measured at points located at distances of 0% (core center), 37.5%, 75.0% and 100% (core surface) from the core center of the spherical core, a hardness difference (Hs−Ho) between a surface hardness (Hs) thereof and a center hardness (Ho) thereof is 20 or more, a ratio (($H_{37.5}$−Ho)/($H_{75.0}$−Ho)) of a hardness difference ($H_{37.5}$−Ho) to a hardness difference ($H_{75.0}$−Ho) is 0.6 or less, and a compression deformation amount (D (mm)) of the spherical core and the 37.5% point hardness ($H_{37.5}$) satisfy a relation of $H_{37.5} \leq -9 \times D + 95$.

13 Claims, 13 Drawing Sheets

(51) Int. Cl.
*A63B 37/06* (2006.01)
*A63B 37/00* (2006.01)
*C08K 5/00* (2006.01)
*C08L 9/00* (2006.01)
*C08K 5/09* (2006.01)
*C08G 18/48* (2006.01)
*C08G 18/76* (2006.01)
*C08L 75/08* (2006.01)
*C08K 5/098* (2006.01)
*C08K 5/14* (2006.01)

(52) U.S. Cl.
CPC ...... *A63B 37/0065* (2013.01); *A63B 37/0074* (2013.01); *C08G 18/4854* (2013.01); *C08G 18/7671* (2013.01); *C08K 5/0025* (2013.01); *C08K 5/09* (2013.01); *C08L 9/00* (2013.01); *C08L 75/08* (2013.01); *C08K 5/098* (2013.01); *C08K 5/14* (2013.01); *C08L 2666/52* (2013.01)

(56) References Cited

U.S. PATENT DOCUMENTS

| | | | |
|---|---|---|---|
| 2002/0045497 A1 | 4/2002 | Watanabe | |
| 2003/0144425 A1 | 7/2003 | Mano et al. | |
| 2006/0229414 A1* | 10/2006 | Nanba | A63B 37/0063 525/387 |
| 2007/0129174 A1* | 6/2007 | Higuchi | A63B 37/0087 473/373 |
| 2010/0234137 A1* | 9/2010 | Higuchi | A63B 37/0003 473/373 |
| 2011/0143863 A1* | 6/2011 | Sullivan | A63B 37/0043 473/376 |
| 2012/0172150 A1* | 7/2012 | Mikura | A63B 37/0054 473/372 |
| 2012/0329575 A1* | 12/2012 | Mikura | A63B 37/0063 473/372 |
| 2013/0017905 A1 | 1/2013 | Shindo et al. | |
| 2013/0053179 A1 | 2/2013 | Tarao et al. | |
| 2013/0296077 A1* | 11/2013 | Kimura | A63B 37/0092 473/374 |
| 2014/0073455 A1* | 3/2014 | Ozawa | A63B 37/0012 473/372 |
| 2014/0073460 A1* | 3/2014 | Ozawa | A63B 37/0084 473/377 |
| 2014/0073461 A1* | 3/2014 | Ozawa | A63B 37/0084 473/377 |
| 2014/0187351 A1* | 7/2014 | Nakamura | A63B 37/0023 473/373 |

FOREIGN PATENT DOCUMENTS

| | | |
|---|---|---|
| JP | 3674679 B2 | 7/2005 |
| JP | 2012-139415 A | 7/2012 |
| JP | 2012-192158 A | 10/2012 |

OTHER PUBLICATIONS

English translation of the Chinese Office Action dated Feb. 3, 2016 for Application No. 201410239930.2.
Extended European Search Report, dated Mar. 6, 2015, for European Application No. 14170425.4.
Partial European Search Report, dated Oct. 9, 2014, for European Application No. 14170425.4.
English translation of the Korean Office Action for Korean Application No. 10-2014-0066357, dated Mar. 4, 2016.
English translation of the Chinese Office Action, dated Aug. 29, 2016, for Chinese Application No. 201410239930.2.
English translation of the Japanese Office Action, dated Sep. 12, 2017, for Japanese Application No. 2014-039187.

* cited by examiner

GOLF BALL

FIELD OF THE INVENTION

The present invention relates to a golf ball showing an excellent flight performance, in particular, an improvement of a core of a golf ball.

DESCRIPTION OF THE RELATED ART

As a method for improving a flight distance on driver shots, for example, there are methods of enhancing resilience of a core and controlling a hardness distribution of a core. The former method has an effect of enhancing an initial speed, and the latter method has an effect of a lower spin rate. A golf ball having a low spin rate travels a great distance.

For example, Japanese Patent Publications Nos. 3674679 B, 3672016 B, 2012-139415 A, and 2012-192158 A disclose a technique of controlling a hardness distribution of the core. Japanese Patent Publications Nos. 3674679B and 3672016 B disclose a multi-piece solid golf ball having a solid core, wherein the solid core is formed from a rubber composition containing a base rubber, a crosslinking agent and an organic peroxide, and a mixture of 2,5-dimethyl-2,5-di-t-butylperoxyhexyne and 1,1-bis-(t-butylperoxy)-3,3,5-trimethylcyclohexane is used as the organic peroxide, the mixture is in an amount of 0.1 part to 5 parts by mass with respect to 100 parts by mass of the base rubber, and the core has a maximum hardness at a portion 3-10 mm inside from the core surface, and a difference between the maximum hardness and a core center hardness is 3 or more in JIS-C hardness.

Japanese Patent Publication No. 2012-139415 A discloses a golf ball comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, (d) a salt of a carboxylic acid and (e) an organic sulfur compound, provided that the rubber composition further contains (f) a metal compound in case of containing only (b) the α,β-unsaturated carboxylic acid having 3 to 8 carbon atoms as the co-crosslinking agent, and a content of (d) the salt of the carboxylic acid is 10 parts or more and less than 40 parts by mass with respect to 100 parts by mass of (a) the base rubber.

Japanese Patent Publication No. 2012-192158 A discloses a golf ball comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, (d) a carboxylic acid and (e) an organic sulfur compound, provided that the rubber composition further contains (f) a metal compound in case of containing only (b) the α,β-unsaturated carboxylic acid having 3 to 8 carbon atoms as the co-crosslinking agent.

SUMMARY OF THE INVENTION

An object of the present invention is to provide a golf ball showing an excellent flight performance.

The present invention provides a golf ball comprising a spherical core and at least one cover layer covering the spherical core, wherein when JIS-C hardness of the spherical core is measured at points located at distances of 0% (core center), 37.5%, 75.0% and 100% (core surface) from the core center of the spherical core, a hardness difference (Hs−Ho) between a surface hardness (Hs) thereof and a center hardness (Ho) thereof is 20 or more, a ratio (($H_{37.5}$−Ho)/($H_{75.0}$−Ho)) of a hardness difference ($H_{37.5}$−Ho) between a 37.5% point hardness ($H_{37.5}$) and a center hardness (Ho) to a hardness difference ($H_{75.0}$−Ho) between a 75.0% point hardness ($H_{75.0}$) and a center hardness (Ho) is 0.6 or less, and a compression deformation amount (D (mm)) of the spherical core when applying a load from an initial load of 98N to a final load of 1275 N to the spherical core and the 37.5% point hardness ($H_{37.5}$) satisfy a relation of $H_{37.5} \leq -9 \times D + 95$. The spherical core having such a hardness distribution provides a lowered spin rate on driver shots, as a result, the golf ball of the present invention travels a great flight distance on driver shots.

The spherical core is preferably formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a carboxylic acid and/or a salt thereof. The action of (d) the carboxylic acid and/or the salt thereof in the rubber composition used for the golf ball of the present invention, is considered as follows. The metal salt of (b) the α,β-unsaturated carboxylic acid having 3 to 8 carbon atoms blended in the rubber composition is considered to form an ion cluster in the core, thereby crosslinking the rubber molecular chain with metals. By blending (d) the carboxylic acid and/or the salt thereof into this rubber composition, (d) the carboxylic acid and/or the salt thereof exchange a cation with the ion cluster formed from the metal salt of (b) the α,β-unsaturated carboxylic acid having 3 to 8 carbon atoms, thereby breaking the metal crosslinking formed by the metal salt of the α,β-unsaturated carboxylic acid having 3 to 8 carbon atoms. This cation exchange reaction easily occurs at the core central part where the temperature is high, but less occurs toward the core surface. When molding a core, the internal temperature of the core is high at the core central part and decreases toward the core surface, since reaction heat from a crosslinking reaction of the rubber composition accumulates at the core central part. In other words, the breaking of the metal crosslinking by (d) the carboxylic acid and/or the salt thereof easily occurs at the core central part, but less occurs toward the surface. As a result, it is conceivable that since a crosslinking density in the core increases from the center of the core toward the surface thereof, the core hardness increases from the center of the core toward the surface thereof.

The present invention provides a golf ball showing an excellent flight performance.

DESCRIPTION OF THE PREFERRED EMBODIMENT

Figure 1:
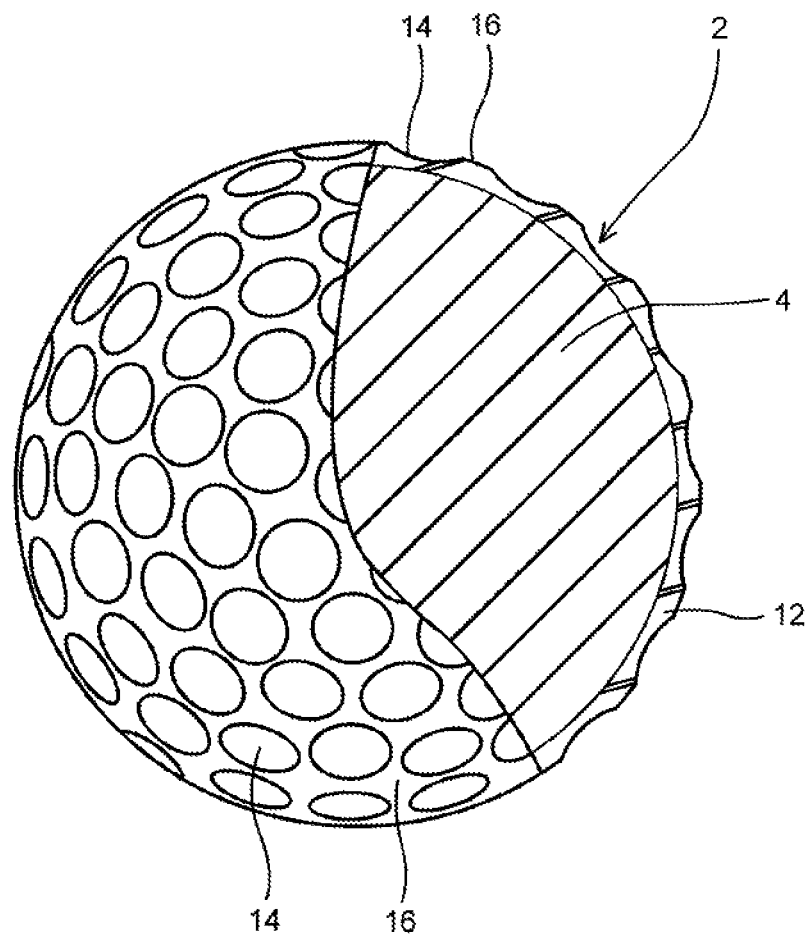
FIG. 1 is a partially cutaway sectional view showing the golf ball according to the preferable embodiment of the present invention.
Figure 2:
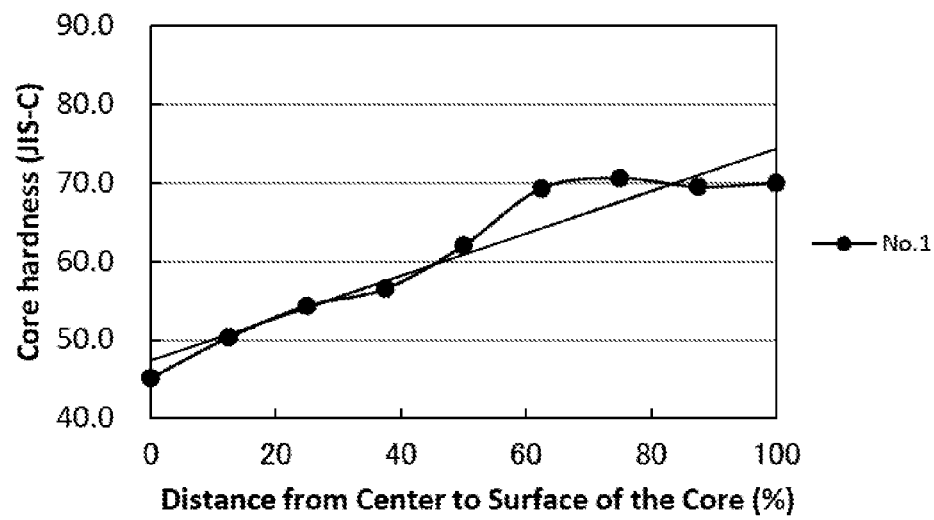
FIG. 2 is a graph showing the hardness distribution of the spherical core.
Figure 3:
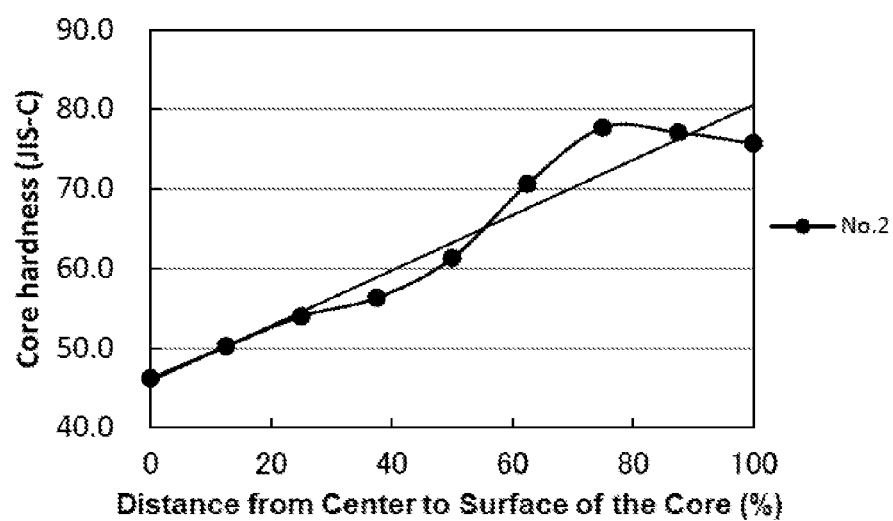
FIG. 3 is a graph showing the hardness distribution of the spherical core.
Figure 4:
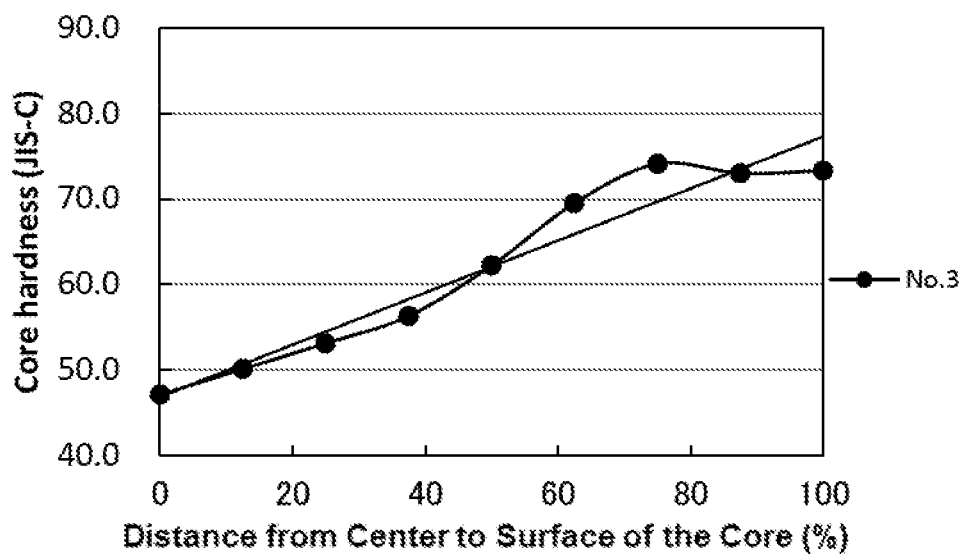
FIG. 4 is a graph showing the hardness distribution of the spherical core.
Figure 5:
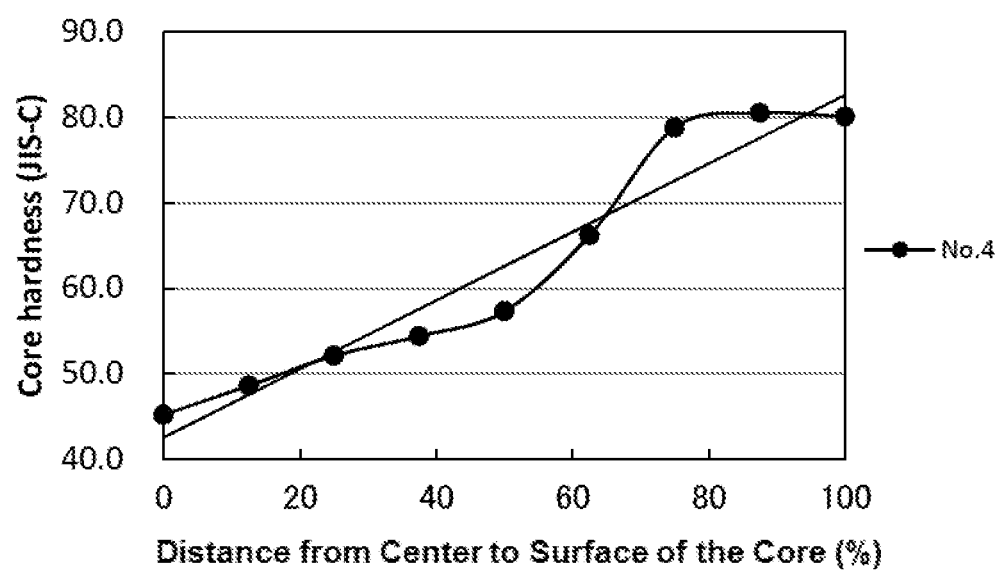
FIG. 5 is a graph showing the hardness distribution of the spherical core.
Figure 6:
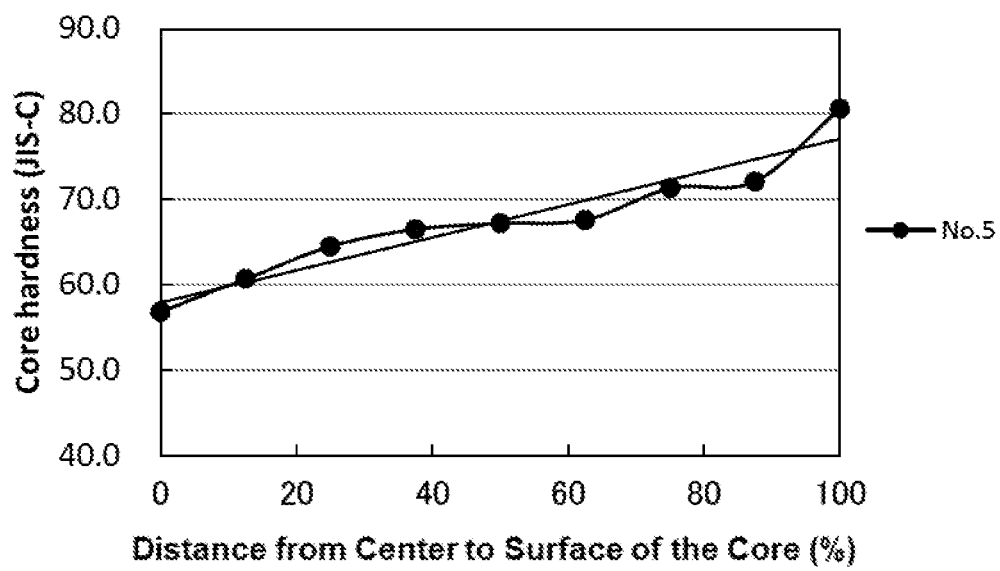
FIG. 6 is a graph showing the hardness distribution of the spherical core.
Figure 7:
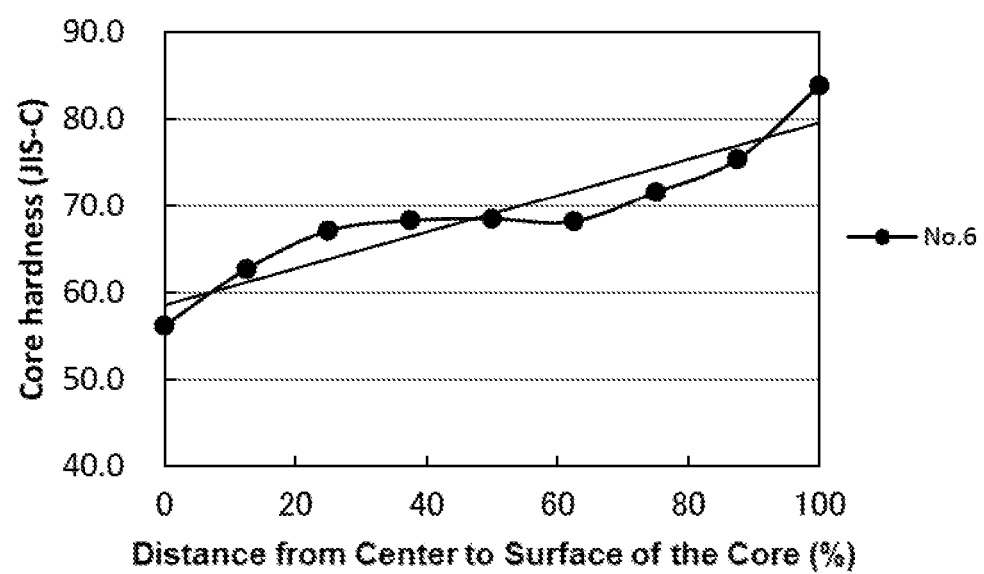
FIG. 7 is a graph showing the hardness distribution of the spherical core.
Figure 8:
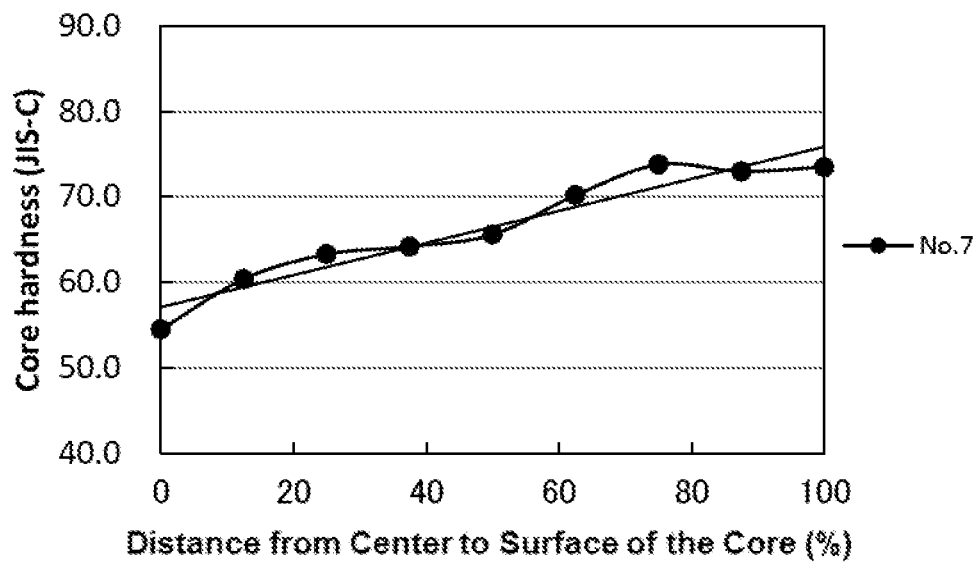
FIG. 8 is a graph showing the hardness distribution of the spherical core.
Figure 9:
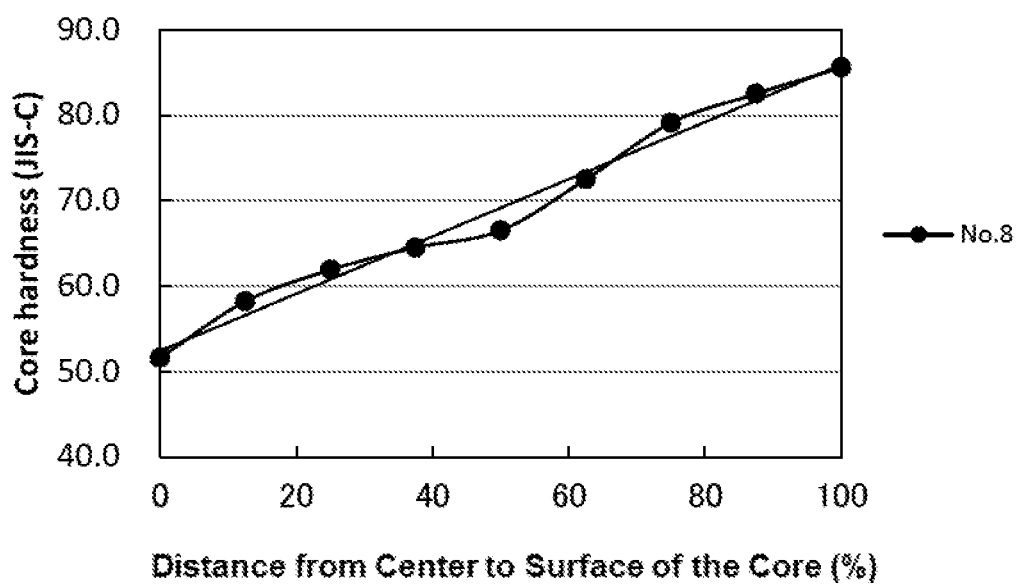
FIG. 9 is a graph showing the hardness distribution of the spherical core.
Figure 10:
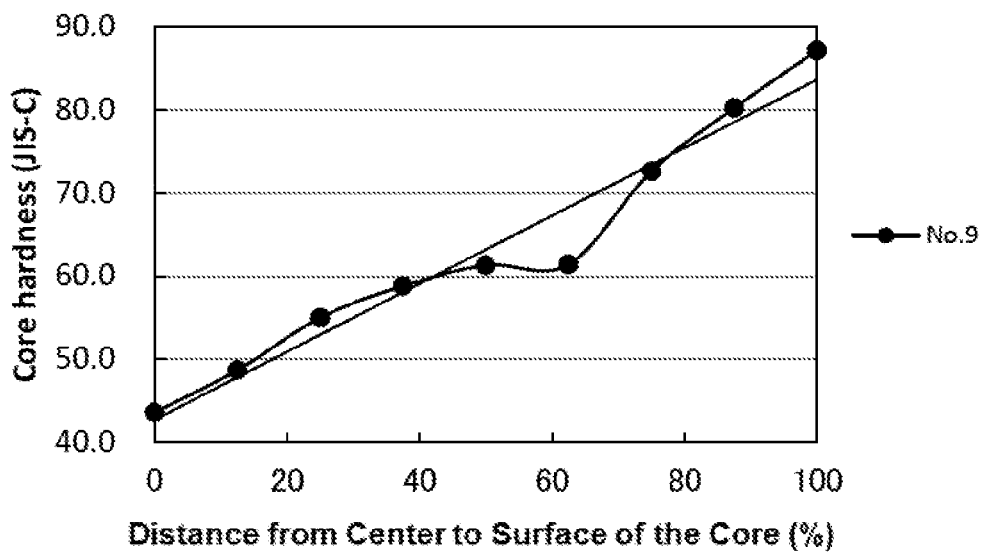
FIG. 10 is a graph showing the hardness distribution of the spherical core.
Figure 11:
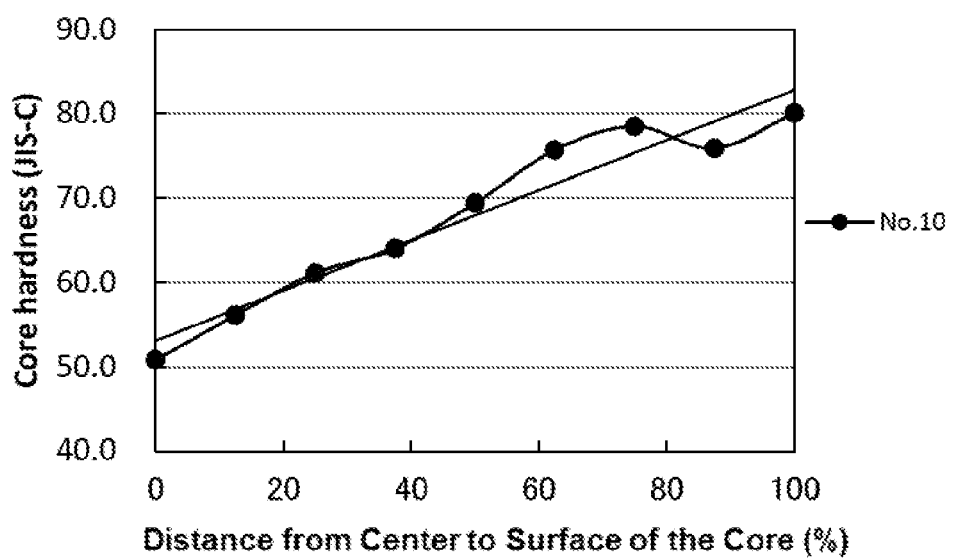
FIG. 11 is a graph showing the hardness distribution of the spherical core.
Figure 12:
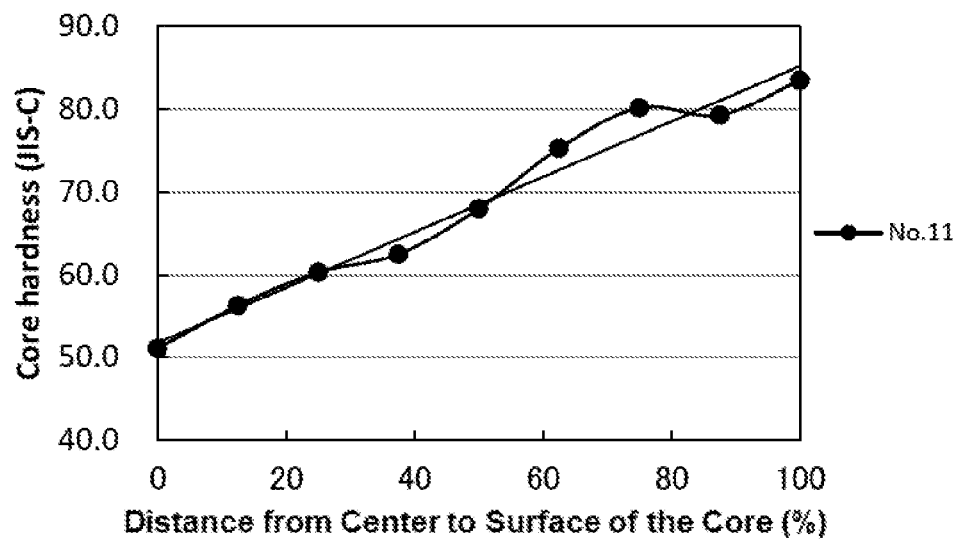
FIG. 12 is a graph showing the hardness distribution of the spherical core.
Figure 13:
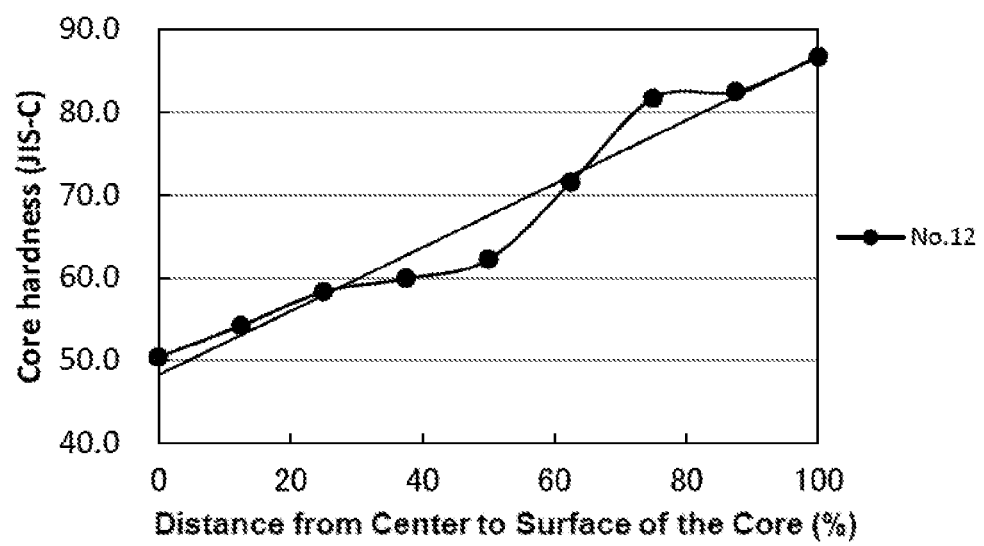
FIG. 13 is a graph showing the hardness distribution of the spherical core.
Figure 14:
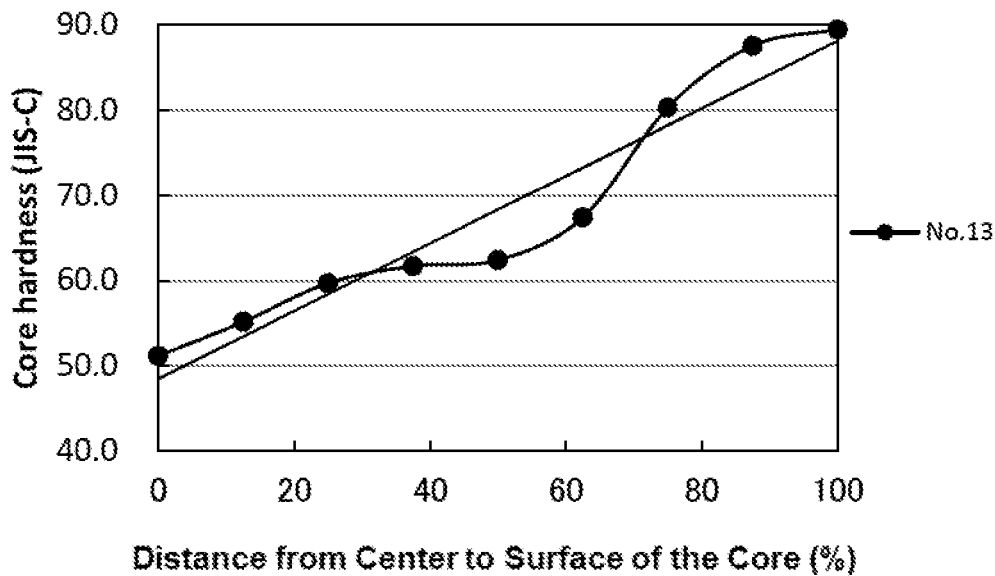
FIG. 14 is a graph showing the hardness distribution of the spherical core.
Figure 15:
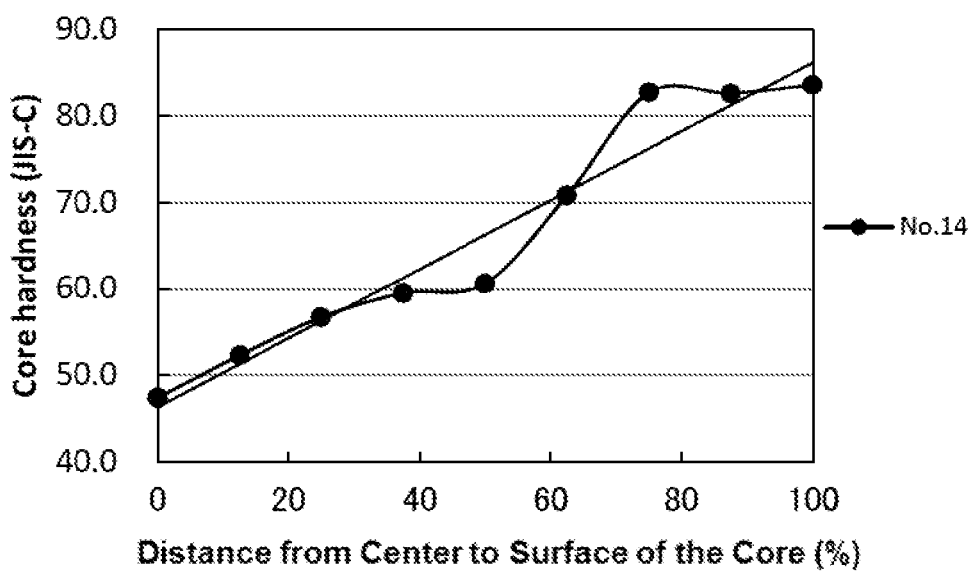
FIG. 15 is a graph showing the hardness distribution of the spherical core.
Figure 16:
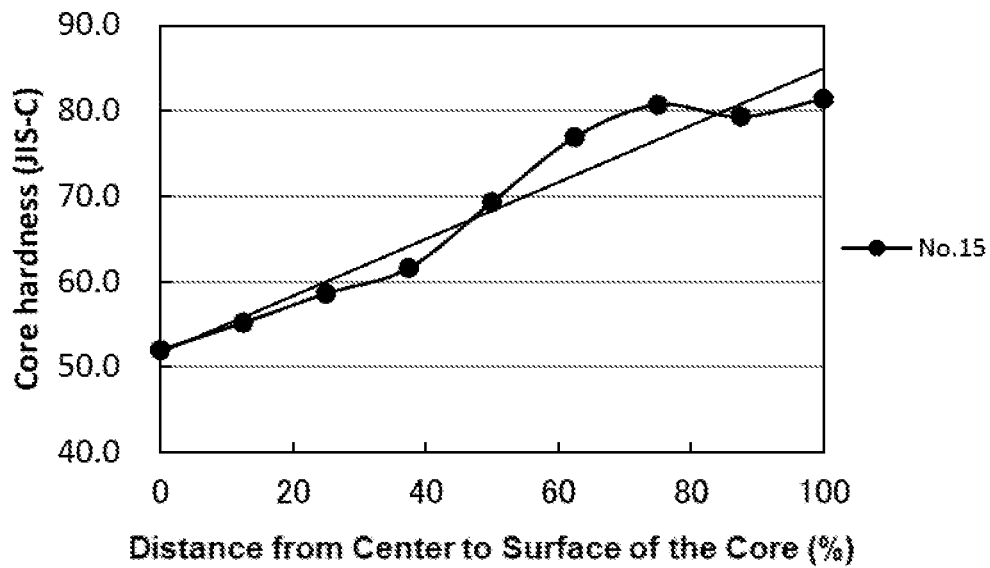
FIG. 16 is a graph showing the hardness distribution of the spherical core.
Figure 17:
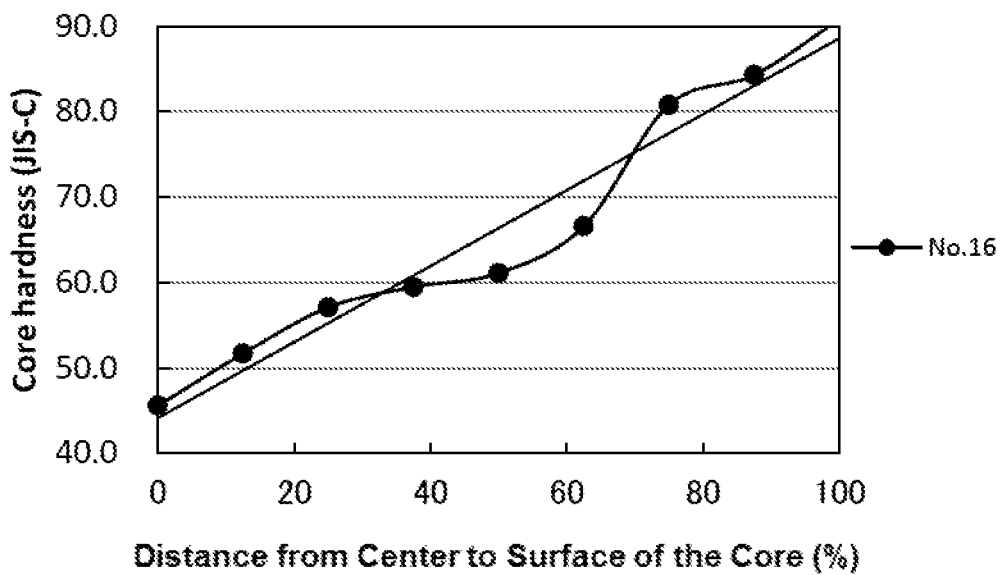
FIG. 17 is a graph showing the hardness distribution of the spherical core.
Figure 18:
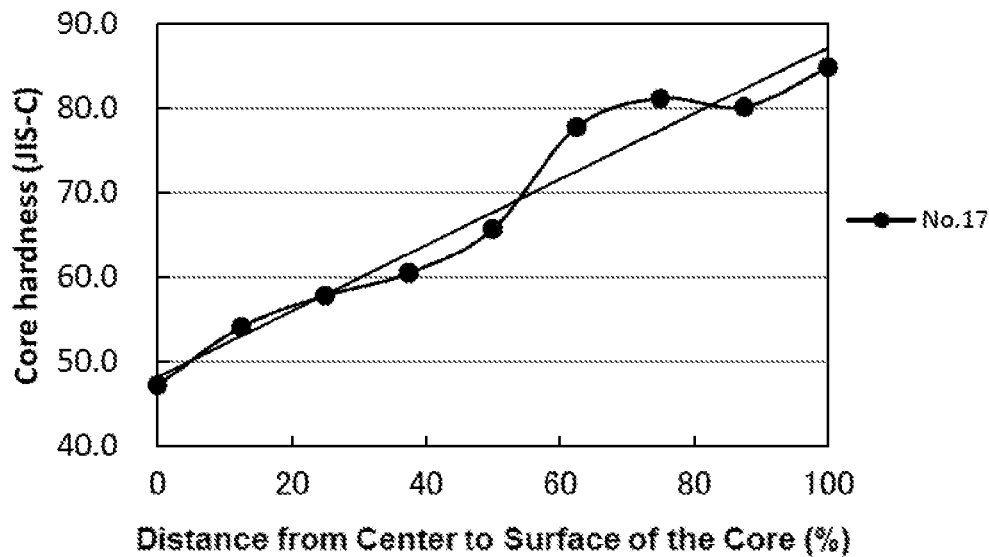
FIG. 18 is a graph showing the hardness distribution of the spherical core.
Figure 19:
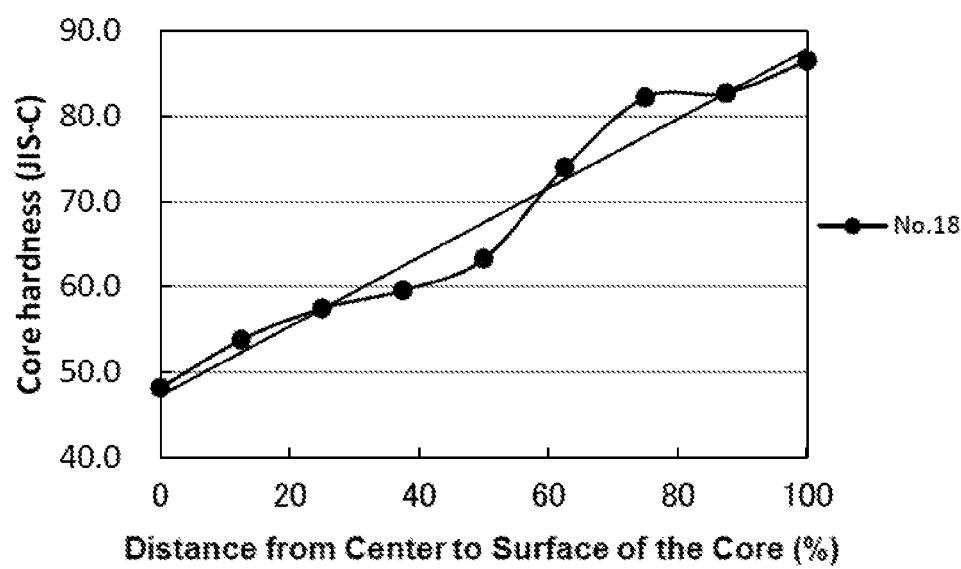
FIG. 19 is a graph showing the hardness distribution of the spherical core.
Figure 20:
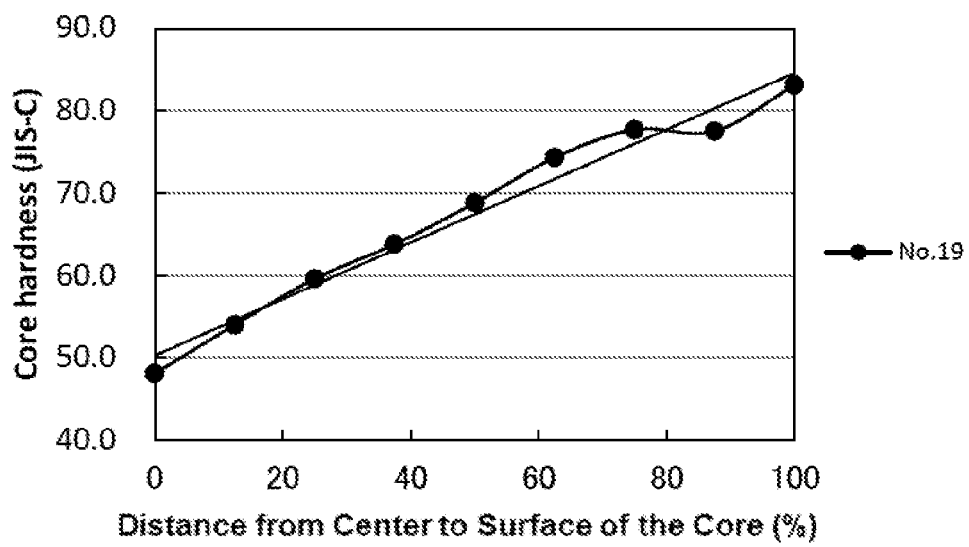
FIG. 20 is a graph showing the hardness distribution of the spherical core.
Figure 21:
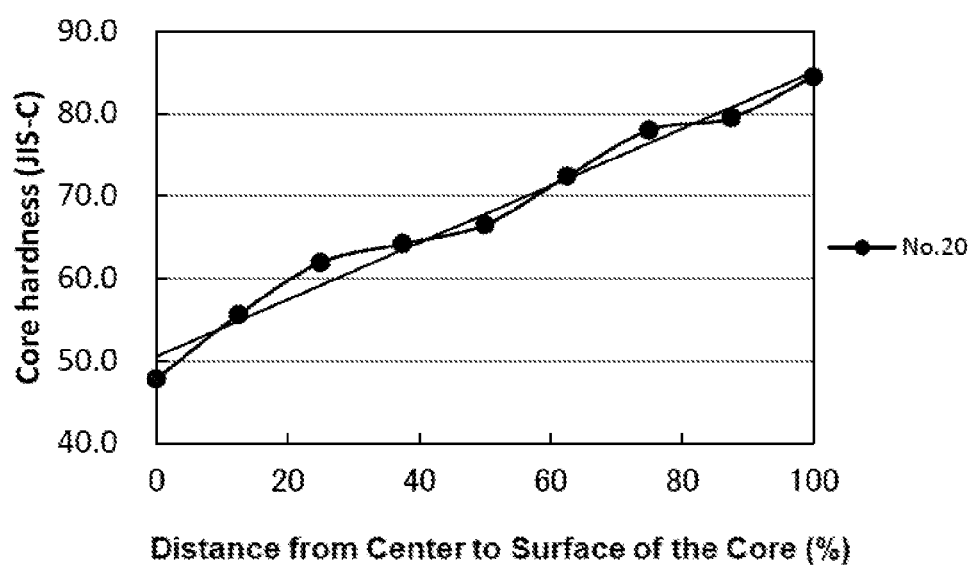
FIG. 21 is a graph showing the hardness distribution of the spherical core.
Figure 22:
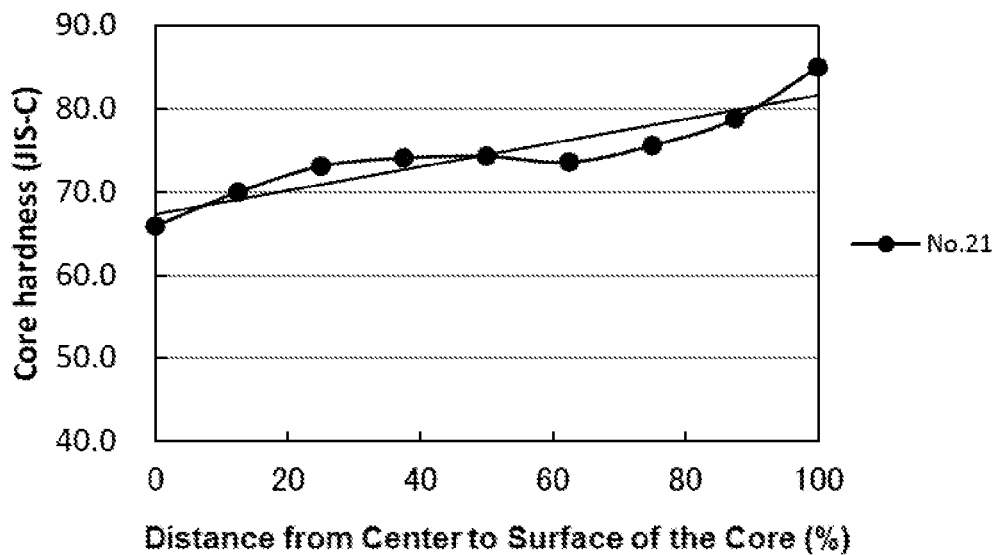
FIG. 22 is a graph showing the hardness distribution of the spherical core.
Figure 23:
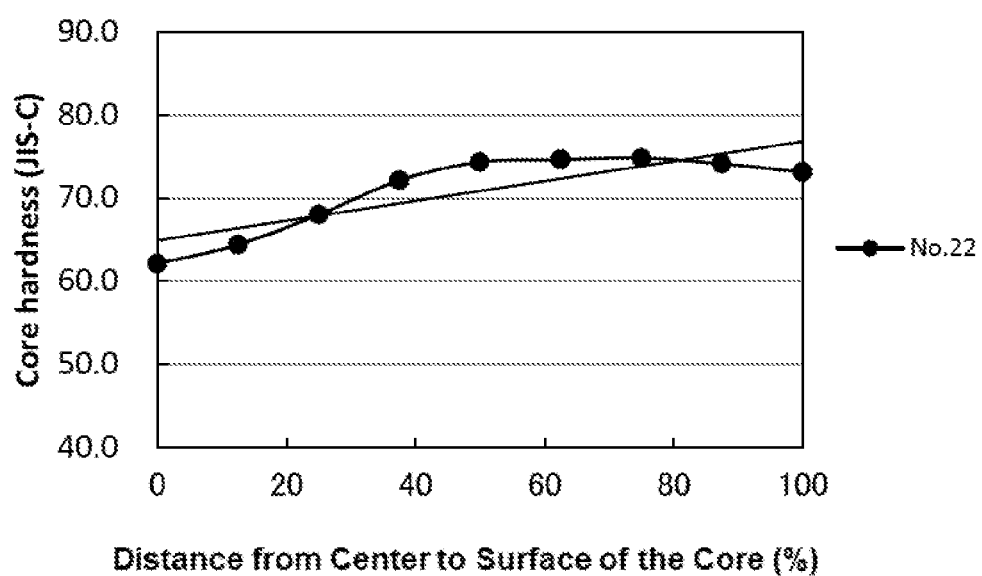
FIG. 23 is a graph showing the hardness distribution of the spherical core.
Figure 24:
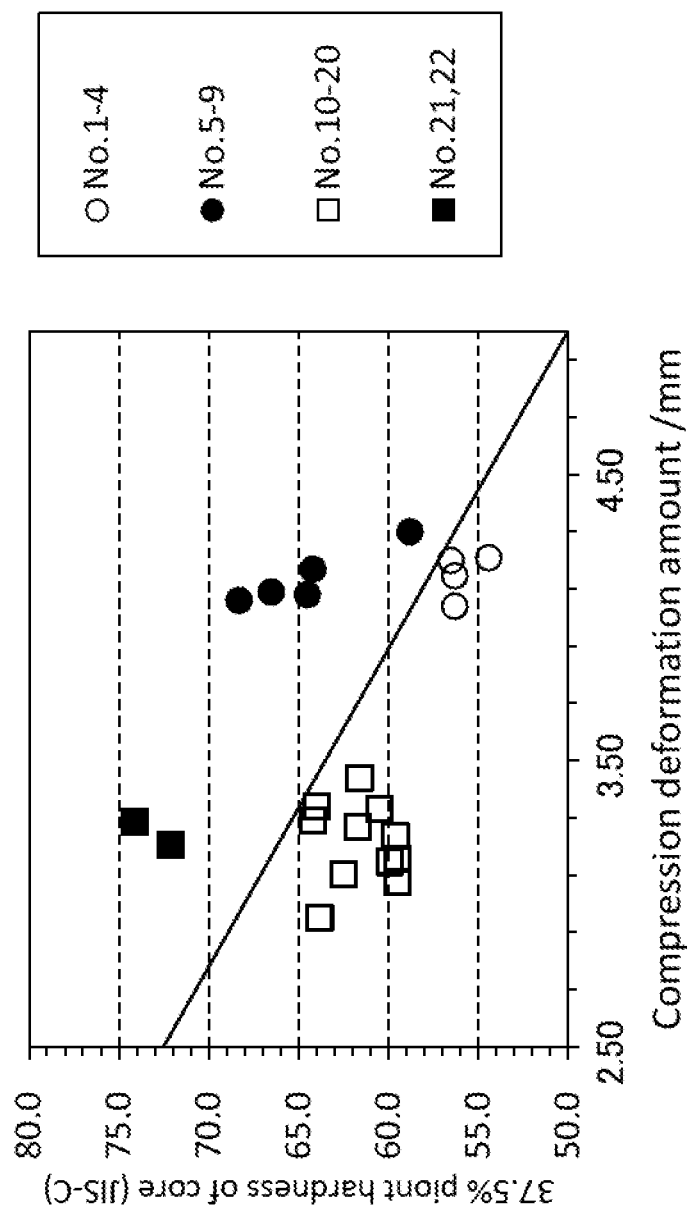
FIG. 24 is a graph showing the relation of the 37.5% point hardness and the compression deformation amount of the core.

The golf ball of the present invention has a spherical core and at least one cover layer covering the spherical core. The golf ball construction of the present invention is not limited, as long as the golf ball comprises a spherical core and at least one cover layer covering the spherical core. FIG. 1 is a partially cutaway sectional view showing the golf ball 2 according to the preferable embodiment of the present invention. The golf ball 2 comprises a spherical core 4, and a cover 12 covering the spherical core 4. A plurality of dimples 14 are formed on the surface of the cover. Other portions than dimples 14 on the surface of the golf ball 2 are land 16. The golf ball 2 is provided with a paint layer and a mark layer outside the cover 12, but these layers are not depicted.

The golf ball of the present invention is characterized in that a hardness distribution of the spherical core satisfies the following requirements (I) to (III), when JIS-C hardness of the spherical core is measured at nine points obtained by dividing a radius of the spherical core into equal parts having a 12.5% interval, namely at nine points located at distances of 0% (core center), 12.5%, 25.0%, 37.5%, 50.0%, 62.5%, 75.0%, 87.5% and 100% (core surface) from the core center. The spherical core having such a hardness distribution provides a lowered spin rate on driver shots, and as a result, the golf ball of the present invention travels a great flight distance on driver shots.

(I) A hardness difference (Hs−Ho) between a surface hardness (Hs) and a center hardness (Ho) is 20 or more in JIS-C hardness. If the hardness difference between the core surface and the core center is large, a golf ball traveling a great flight distance due to a higher launch angle and a lower spin rate can be obtained. The hardness difference (Hs−Ho) is preferably 25 or more, more preferably 28 or more, and is preferably 80 or less, more preferably 70 or less, even more preferably 60 or less, in JIS-C hardness.

(II) A ratio (($H_{37.5}$−Ho)/($H_{75.0}$−Ho)) of a hardness difference ($H_{37.5}$−Ho) between a 37.5% point hardness ($H_{37.5}$) and a center hardness (Ho) to a hardness difference ($H_{75.0}$−Ho) between a 75.0% point hardness ($H_{75.0}$) and a center hardness (Ho) is 0.6 or less. Since the smaller the ratio of (($H_{37.5}$−Ho)/($H_{75.0}$−Ho)) is, the relatively smaller the 37.5% point hardness ($H_{37.5}$) becomes, a much more lowered spin rate on driver shots can be obtained. The ratio of (($H_{37.5}$−Ho)/($H_{75.0}$−Ho)) is preferably 0.55 or less, more preferably 0.5 or less. The lower limit of the ratio of (($H_{37.5}$−Ho)/($H_{75.0}$−Ho)) is not limited, but 0.1 is preferable.

(III) A compression deformation amount (D(mm)) when applying a load from an initial load of 98 N to a final load of 1275 N to the spherical core and a 37.5% point hardness ($H_{37.5}$) satisfy a relation of $H_{37.5} \leq -9 \times D + 95$. The core satisfying the inequality has a high hardness as a whole, but shows a 37.5% point hardness selectively being controlled at a lower level.

The spherical core preferably has the center hardness Ho of 30 or more, more preferably 35 or more, even more preferably 40 or more in JIS-C hardness. If the center hardness Ho of the spherical core is less than 30 in JIS-C hardness, the core becomes so soft that the resilience thereof may be lowered. Further, the spherical core preferably has the center hardness Ho of 70 or less, more preferably 65 or less, even more preferably 60 or less in JIS-C hardness. If the center hardness Ho exceeds 70 in JIS-C hardness, the core becomes so hard that the shot feeling thereof tends to be lowered.

The spherical core preferably has the surface hardness Hs of 65 or more, more preferably 70 or more, and preferably has the surface hardness Hs of 100 or less, more preferably 95 or less in JIS-C hardness. If the surface hardness of the spherical core is 65 or more in JIS-C hardness, the spherical core does not become excessively soft, and thus the better resilience is obtained. Further, if the surface hardness of the spherical core is 100 or less in JIS-C hardness, the spherical core does not become excessively hard, and thus the better shot feeling is obtained.

The spherical core preferably has a diameter of 34.8 mm or more, more preferably 36.8 mm or more, and even more preferably 38.8 mm or more, and preferably has a diameter of 42.2 mm or less, more preferably 41.8 mm or less, and even more preferably 41.2 mm or less, and most preferably 40.8 mm or less. If the spherical core has the diameter of 34.8 mm or more, the thickness of the cover does not become too thick and thus the resilience becomes better. On the other hand, if the spherical core has the diameter of 42.2 mm or less, the thickness of the cover does not become too thin and thus the cover functions better.

When the spherical core has a diameter of from 34.8 mm to 42.2 mm, a compression deformation amount (a shrinking amount of the spherical core along the compression direction) of the spherical core when applying a load from an initial load of 98 N to a final load of 1275 N is preferably 2.0 mm or more, more preferably 2.8 mm or more, and is preferably 6.0 mm or less, more preferably 5.0 mm or less. If the compression deformation amount is 2.0 mm or more, the shot feeling of the golf ball becomes better. If the compression deformation amount is 6.0 mm or less, the resilience of the golf ball becomes better.

The spherical core preferably has a single layered structure. Unlike the multi-layered structure, the spherical core of the single layered structure does not have an energy loss at the interface of the multi-layered structure when being hit, and thus has an improved resilience. The cover has a structure of at least one layer, for example, a single layered structure, or a multi-layered structure of at least two layers. The golf ball of the present invention includes, for example, a two-piece golf ball comprising a spherical core and a single layered cover disposed around the spherical core; a multi-piece golf ball comprising a spherical core and at least two cover layers disposed around the spherical core (including a three-piece golf ball); and a wound golf ball comprising a spherical core, a rubber thread layer which is formed around the spherical core, and a cover disposed over the rubber thread layer. The present invention can be suitably applied to any one of the above golf ball.

The golf ball of the present invention has at least one cover layer covering the spherical core. The cover has at least one layer, for example, a single layered cover, a two-layered cover comprising an inner cover and an outer cover, and a multi-layered cover of three or more layers.

The thickness of the cover is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, and even more preferably 0.8 mm or more, and most preferably 1.0 mm or more. If the thickness of the cover is less than 0.3 mm, the durability and the wear resistance of the cover may deteriorate. If the cover has a plurality of layers, it is preferred that the total thickness of the cover layers falls within the above range.

The cover is formed from a cover composition. The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and preferably has a slab hardness of 80 or less, more preferably 70 or less in shore D hardness. If the cover composition has the slab hardness of 50 or more, the obtained golf ball has a high launch angle and low spin rate on driver shots and iron shots, and thus the flight distance becomes large. If the cover composition has the slab hardness of 80 or less, the golf ball excellent in durability is obtained.

Further, in case of a so-called spin golf ball which focuses on controllability, the cover composition preferably has a slab hardness of less than 50, and preferably has a slab hardness of 20 or more, more preferably 25 or more in shore D hardness. If the cover composition has the slab hardness of less than 50, the flight distance on driver shots can be improved by the core of the present invention, as well as the obtained golf ball readily stops on the green due to the high spin rate on approach shots. If the cover composition has the slab hardness of 20 or more, the abrasion resistance improves. In case of a plurality of cover layers, the slab hardness of the cover composition constituting each layer can be identical or different, as long as the slab hardness of each layer is within the above range.

The concave portions called "dimple" are usually formed on the surface of the cover. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of the dimples is employed solely or at least two of them may be used in combination.

When the golf ball having the cover has a diameter in a range from 40 mm to 45 mm, a compression deformation amount of the golf ball (a shrinking amount of the golf ball in the compression direction thereof) when applying a load from an initial load of 98 N to a final load of 1275 N to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, and thus exhibits good shot feeling. On the other hand, if the compression deformation amount is 5.0 mm or less, the resilience is enhanced.

The spherical core is preferably formed from a rubber composition containing (a) a base rubber, (b) an $\alpha,\beta$-unsaturated carboxylic acid having 3 to 8 carbon atoms and/or a metal salt thereof as a co-crosslinking agent, (c) a crosslinking initiator and (d) a carboxylic acid and/or a salt thereof.

As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high-cispolybutadiene having a cis-1,4 bond in a proportion of 40 mass % or more, more preferably 80 mass % or more, even more preferably 90 mass % or more in view of its superior resilience property.

The high-cispolybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cispolybutadiene preferably includes one synthesized using a rare-earth element catalyst. When a neodymium catalyst, which employs a neodymium compound of a lanthanum series rare-earth element compound, is used, a polybutadiene rubber having a high content of a cis-1,4 bond and a low content of a 1,2-vinyl bond is obtained with excellent polymerization activity. Such polybutadiene rubber is particularly preferred.

The high-cispolybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$(100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JISK6300 using an L rotor under the conditions of: a preheating time of 1 minute; a rotor rotation time of 4 minutes; and a temperature of 100° C.

The high-cispolybutadiene preferably has a molecular weight distribution Mw/Mn (Mw: weight average molecular weight. Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cispolybutadiene is excessively low, the processability may deteriorate. If the molecular weight distribution (Mw/Mn) of the high-cispolybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

(b) The α,β-unsaturated carboxylic acid having 3 to 8 carbon atoms and/or the metal salt thereof is blended as a co-crosslinking agent in the rubber composition and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition preferably further contains (e) a metal compound as an essential component. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms. Further, in the case of using the α,β-unsaturated carboxylic acid having 3 to 8 carbon atoms and the metal salt thereof in combination, (e) the metal compound may be used as an optional component.

The α,β-unsaturated carboxylic acid having 3 to 8 carbon atoms includes, for example, acrylic acid, methacrylic acid, fumaric acid, maleic acid, crotonic acid, and the like.

Examples of the metal constituting the metal salt of the α,β-unsaturated carboxylic acid having 3 to 8 carbon atoms include: a monovalent metal ion such as sodium, potassium, lithium or the like: a divalent metal ion such as magnesium, calcium, zinc, barium, cadmium or the like; a trivalent metal ion such as aluminum or the like; and other metal ion such as tin, zirconium or the like. The above metal ion can be used solely or as a mixture of at least two of them. Among these metal ions, the divalent metal ion such as magnesium, calcium, zinc, barium, cadmium or the like is preferable. Use of the divalent metal salt of the α,β-unsaturated carboxylic acid having 3 to 8 carbon atoms easily generates a metal crosslinking between the rubber molecules. Especially, as the divalent metal salt, zinc acrylate is preferable, because zinc acrylate enhances the resilience of the resultant golf ball. The α,β-unsaturated carboxylic acid having 3 to 8 carbon atoms and/or the metal salt thereof may be used solely or in combination at least two of them.

The content of (b) the α,β-unsaturated carboxylic acid having 3 to 8 carbon atoms and/or the metal salt thereof is preferably 15 parts by mass or more, more preferably 20 parts by mass or more, and is preferably 50 parts by mass or less, more preferably 45 parts by mass or less, even more preferably 35 parts by mass or less, with respect to 100 parts by mass of (a) the base rubber. If the content of (b) the α,β-unsaturated carboxylic acid having 3 to 8 carbon atoms and/or the metal salt thereof is less than 15 parts by mass, the content of (c) the crosslinking initiator which will be explained below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include a dialkyl peroxide, a peroxy ester, a peroxy ketal, and a hydroperoxide. Specific examples of the dialkyl peroxide include di(2-t-butylperoxyisopropyl)benzene (175.4° C.), dicumyl peroxide (175.2° C.), 2,5-dimethyl-2,5-di(t-butylperoxy)hexane (179.8° C.), t-butylcumyl peroxy (173.3° C.), di-t-hexyl peroxy (176.7° C.), di-t-butyl peroxy (185.9° C.), 2,5-dimethyl-2,5-di(t-butylperoxy)hexyne-3 (194.3° C.) and the like. Specific examples of the peroxy ester include t-butyl peroxymaleate (167.5° C.), t-butylperoxy-3,3,5-trimethyl cyclohexanoate (166.0° C.), t-butyl peroxylaurate (159.4° C.), t-butylperoxy isopropyl monocarbonate (158.8° C.), t-hexyl peroxybenzoate (160.3° C.), 2,5-dimethyl-2,5-di (benzoylperoxy)hexane (158.2° C.), t-butyl peroxyacetate (159.9° C.) and t-butyl peroxybenzoate (166.8° C.). Specific examples of the peroxy ketal include 1,1-di(t-hexylperoxy)-3,3,5-trimethyl cyclohexane (147.1° C.), 1,1-di(t-hexylperoxy)cyclohexane (149.2° C.), 1,1-di(t-butylperoxy)-2-methyl cyclohexane (142.1° C.), 1,1-di(t-butylperoxy) cyclohexane (153.8° C.), 2,2-di(t-butylperoxy)butane (159.9° C.), n-butyl-4,4-di(t-butylperoxy)valerate (172.5° C.), and 2,2-di(4,4-di(t-butylperoxy)cyclohexyl) propane (153.8° C.). Specific examples of the hydroperoxide include p-menthane hydroperoxide (199.5° C.) and diisopropylbenzene hydroperoxide (232.5° C.). Among them, the dialkyl peroxide and/or the peroxy ketal are preferable. These organic peroxides may be used solely or in combination at least two of them. It is noted that the values described in the parentheses after the compound names of the above organic peroxides indicate one-minute half-life temperatures thereof.

The content of (c) the crosslinking initiator is preferably 0.2 part by mass or more, and more preferably 0.5 part by mass or more, and is preferably 5 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes so soft that the golf ball tends to have the lower resilience. If the content of (c) the crosslinking initiator exceeds 5 parts by mass, the amount of (b) the co-crosslinking agent must be decreased in order to obtain the appropriate hardness of the constituting member formed from the rubber composition, probably resulting in the insufficient resilience or lower durability of the golf ball.

(d) The carboxylic acid and/or the salt thereof used in the present invention will be described. It is considered that (d) the carboxylic acid and/or the salt thereof has an action of breaking the metal crosslinking by the metal salt of (b) the α,β-unsaturated carboxylic acid having 3 to 8 carbon atoms, in the center part of the core, when molding the core. (d) The carboxylic acid and/or the salt thereof includes an aliphatic carboxylic acid and/or a salt thereof, or an aromatic carboxylic acid and/or a salt thereof. (d) The carboxylic acid and/or the salt thereof may be used alone or as a mixture of at least two of them. It is noted that (d) the carboxylic acid and/or the salt thereof does not include (b) the α,β-unsaturated carboxylic acid having 3 to 8 carbon atoms and/or the metal salt thereof as the co-crosslinking agent.

The aliphatic carboxylic acid preferably includes an aliphatic carboxylic acid having 1 to 30 carbon atoms, more preferably an aliphatic carboxylic acid having 1 to 18 carbon atoms, even more preferably an aliphatic carboxylic acid having 1 to 13 carbon atoms. It is noted that (d) the aliphatic carboxylic acid and/or the salt thereof does not include (b) the α,β-unsaturated carboxylic acid having 3 to 8 carbon atoms and/or the metal salt thereof used as the co-crosslinking agent.

The aliphatic carboxylic acid may be either a saturated fatty acid or an unsaturated fatty acid. The aliphatic carboxylic acid may have a branched structure or a cyclic structure. Specific examples of the saturated fatty acids (IUPAC name) are methanoic acid (C1), ethanoic acid (C2), propanoic acid (C3), butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecanoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), and triacontanoic acid (C30).

Specific examples of the unsaturated fatty acid (IUPAC name) are ethenoic acid (C2), propenoic acid (C3), butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), and triacontenoic acid (C30).

Specific examples of the fatty acid (common name) are, formic acid (C1), acetic acid (C2), propionic acid (C3), butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30).

The aromatic carboxylic acid includes an aromatic carboxylic acid having a benzene ring in the molecule thereof, and an aromatic carboxylic acid having a heteroaromatic ring in the molecule thereof. The aromatic carboxylic acid may be used solely or in combination of at least two of them.

Specific examples of (d) the carboxylic acid having a benzene ring include, for example, an aromatic carboxylic acid having a carboxyl group directly bonding to the benzene ring, an aromatic-aliphatic carboxylic acid having an aliphatic carboxylic acid bonding to the benzene ring, a polynuclear aromatic carboxylic acid having a carboxyl group directly bonding to a fused benzene ring, and a polynuclear aromatic-aliphatic carboxylic acid having an aliphatic carboxylic acid bonding to a fused benzene ring. The fused benzene ring structure includes, for example, naphthalene, anthracene, phenalene, phenanthrene, tetracene and pyrene.

The number of carboxyl group in (d) the carboxylic acid having a benzene ring may be one (monocarboxylic acid), two or more (polycarboxylic acid), but one is preferred. A substituent group other than a carboxyl group may directly bond to the benzene ring or fused benzene ring. Such a substituent group includes, for example, an alkyl group (preferably an alkyl group having 1 to 4 carbon atoms), an aryl group (preferably phenyl group), an amino group, a hydroxyl group, an alkoxy group (preferably an alkoxy group having 1 to 4 carbon atoms), an oxo group, or a halogen group.

Specific examples of the aromatic carboxylic acid having a carboxyl group directly bonding to the benzene ring include, for example, benzoic acid (C7), phthalic acid (C8), isophthalic acid (C8), terephthalic acid (C8), benzene-1,2,3-tricarboxylic acid (C9), benzene-1,2,4-tricarboxylic acid (C9), benzene-1,3,5-tricarboxylic acid (C9), benzene-1,2,3,4-tetracarboxylic acid (C10), benzene-1,2,3,5-tetracarboxylic acid (C10), benzene-1,2,4,5-tetracarboxylic acid (C10), and benzene hexacarboxylic acid (C12). Specific examples of the aromatic-aliphatic carboxylic acid having an aliphatic carboxylic acid bonding to the benzene ring include, for example, phenylacetic acid (C8), 2-phenylpropanoic acid (C9), and 3-phenylpropanoic acid (C9).

Furthermore, examples of the carboxylic acid having a benzene ring substituted with an alkyl group, aryl group, amino group, hydroxyl group, alkoxy group, or oxo group include, for example, methylbenzoic acid (C8), dimethylbenzoic acid (C9), 2,3,4-trimethylbenzoic acid (C10), 2,3,5-trimethylbenzoic acid (C10), 2,4,5-trimethylbenzoic acid (C10), 2,4,6-trimethylbenzoic acid (C10), 3,4,5-trimethylbenzoic acid (C10), 4-isopropylbenzoic acid (C10), 4-tert-butylbenzoic acid (C11), 5-methylisophthalic acid (C9), biphenyl-4-carboxylic acid (C13), biphenyl-2,2'-dicarboxylic acid (C14), 4-dimethylaminobenzoic acid (C9), 2-hydroxybenzoic acid (C7), methoxybenzoic acid (C8), hydroxy(methyl)benzoic acid (C8), 2-hydroxy-3-methylbenzoic acid (C8), 2-hydroxy-4-methylbenzoic acid (C8), 2-hydroxy-5-methylbenzoic acid (C8), 2,3-dihydroxybenzoic acid (C7), 2,4-dihydroxybenzoic acid (C7), 2,6-dihydroxybenzoic acid (C7), 3,4-dihydroxybenzoic acid (C7), 3,5-dihydroxybenzoic acid (C7), 4-hydroxy-3-methoxybenzoic acid (C8), 3-hydroxy-4-methoxybenzoic acid (C8), 3,4-dimethoxybenzoic acid (C9), 2,3-dimethoxybenzoic acid (C9), 2,4-dimethoxybenzoic acid (C9), 2,4-dihydroxy-6-methylbenzoic acid (C8), 4,5-dimethoxyphthalic acid (C10), 3,4,5-trihydroxybenzoic acid (C7), 4-hydroxy-3,5-dimethoxybenzoic acid (C9), 2,4,5-trimethoxybenzoic acid (C10), hydroxy(phenyl)acetic acid (C8), hydroxy(4-hydroxy-3-methoxyphenyl)acetic acid (C9), (4-methoxyphenyl)acetic acid (C9), (2,5-dihydroxyphenyl)acetic acid (C8), (3,4-dihydroxyphenyl)acetic acid (C8), (4-hydroxy-3-methoxyphenyl)acetic acid (C9), (3-hydroxy-4-methoxyphenyl)acetic acid (C9), (3,4-dimethoxyphenyl)acetic acid (C10), (2,3-dimethoxyphenyl)acetic acid (C10), 2-(carboxymethyl)benzoic acid (C9), 3-(carboxymethyl)benzoic acid (C9), 4-(carboxymethyl)benzoic acid (C9), 2-(carboxycarbonyl)benzoic acid (C9), 3-(carboxycarbonyl)benzoic acid (C9), 4-(carboxycarbonyl)benzoic acid (C9), 2-hydroxy-2-phenylpropanoic acid (C9), 3-hydroxy-2-phenylpropanoic acid (C9), 3-(2-hydroxyphenyl)propanoic acid (C9), 3-(4-hydroxyphenyl)propanoic acid (C9), 3-(3,4-dihydroxyphenyl)propanoic acid (C9), 3-(4-hydroxy-3-methoxyphenyl)propanoic acid (C10), 3-(3-hydroxy-4-methoxyphenyl)propanoic acid (C10), 3-(4-hydroxyphenyl) acrylic acid (C9), 3-(2,4-dihydroxyphenyl)acrylic acid (C9), 3-(3,4-dihydroxyphenyl)acrylic acid (C9), 3-(4-hydroxy-3-methoxyphenyl)acrylic acid (C10), 3-(3-hydroxy-4-methoxyphenyl) acrylic acid (C10), and 3-(4-hydroxy-3,5-dimethoxyphenyl)acrylic add) (C11).

The carboxylic acid having the benzene ring substituted with halogen includes, for example, carboxylic acids where at least one hydrogen of benzoic add is substituted with a fluoro group such as fluorobenzoic add, difluorobenzoic acid, trifluorobenzoic acid, tetrafluorobenzoic acid, and pentafluorobenzoic acid; carboxylic acids where at least one hydrogen of benzoic acid is substituted with a chloro group such as chlorobenzoic acid, dichlorobenzoic acid, trichlorobenzoic acid, tetrachlorobenzoic acid, and pentachlorobenzoic acid; carboxylic acids where at least one hydrogen of benzoic acid is substituted with a bromo group such as bromobenzoic acid, dibromobenzoic acid, tribromobenzoic acid, tetrabromobenzoic acid, and pentabromobenzoic acid; and carboxylic acids where at least one hydrogen of benzoic acid is substituted with a iodo group such as iodobenzoic acid, diiodobenzoic acid, triiodobenzoic acid, tetraiodobenzoic acid, and pentaiodobenzoic acid.

Specific examples of the polynuclear aromatic carboxylic acid having a carboxyl group directly bonding to the fused benzene ring include 1-naphthalene carboxylic acid, 2-naphthalene carboxylic acid, 1-anthracene carboxylic acid, 2-anthracene carboxylic acid, 9-anthracene carboxylic acid, phenanthrene carboxylic acid, and pyrene carboxylic acid. Specific examples of the polynuclear aromatic-aliphatic carboxylic acid where the aliphatic carboxylic acid is bonded to the fused benzene ring include naphthylacetic acid, and naphthylpropionic acid.

The carboxylic acid having a fused benzene ring substituted with halogen includes, for example, fluoronaphthalene carboxylic acid, chloronaphthalene carboxylic acid, bromonaphthalene carboxylic acid, fluoroanthracene carboxylic acid, chloroanthracene carboxylic acid, and bromoanthracene carboxylic acid.

The carboxylic acid having a heteroaromatic ring includes, for example, a carboxylic acid where a carboxylic acid is directly bonded to the heteroaromatic ring. The hetero atom in the heteroaromatic ring can be one kind or two or more kinds. The hetero atom includes a nitrogen atom, oxygen atom, sulfur atom or the like. Among them, the oxygen atom or sulfur atom is preferred. The number of the hetero atom in the heteroaromatic ring is not particularly limited, but preferably 2 or less, and more preferably 1. The heteroaromatic ring includes, for example, a pyrrole ring, furan ring, thiophene ring, imidazole ring, pyrazole ring, oxazole ring, thiazole ring, pyridine ring, pyrazine ring, indole ring, quinolone ring, benzofuran ring, and benzothiophene ring.

(d) The carboxylic acid having a heteroaromatic ring may be a compound having only a carboxyl group as a substituent group to the heteroaromatic ring, or a compound having another substituent group directly bonding to the heteroaromatic ring in addition to the carboxyl group. Further, the substituent group may bond to a nitrogen atom constituting the heteroaromatic ring. The substituent group includes, for example, halogen, a hydroxyl group, a mercapto group, an alkyl group, an aryl group, an aralkyl group, an alkylaryl group, an alkoxyl group, an amino group which may be substituted, a cyano group, or a thiocarboxyl group.

Specific examples of the carboxylic acid having the heteroaromatic ring and/or the salt thereof include, carboxylic acids having a five-membered heteroaromatic ring such as a pyrrole carboxylic acid, furan carboxylic acid, thiophene carboxylic acid, imidazole carboxylic acid, pyrazole carboxylic acid, oxazole carboxylic acid, and thiazole carboxylic acid; carboxylic acids having a six-membered heteroaromatic ring such as a pyridine carboxylic acid, and a pyrazine carboxylic acid; and carboxylic acids having a fused heteroaromatic ring such as an indolecarboxylic acid, quinolinecarboxylic acid, benzofuran carboxylic acid, and benzothiophene carboxylic acid.

As (d) the salt of the aliphatic carboxylic acid or aromatic carboxylic acid, a salt of the aliphatic carboxylic acid or aromatic carboxylic acid described above may be used. The cation component of the salt of these carboxylic acids may be any one of a metal ion, an ammonium ion and an organic cation. The metal ion includes monovalent metal ions such as sodium, potassium, lithium, silver and the like; divalent metal ions such as magnesium, calcium, zinc, barium, cadmium, copper, cobalt, nickel, manganese and the like; trivalent metal ions such as aluminum, iron and the like; and other ions such as tin, zirconium, titanium and the like. The cation components may be used alone or as a mixture of at least two of them.

The organic cation includes a cation having a carbon chain. The organic cation includes, for example, without limitation, an organic ammonium ion. Examples of the organic ammonium ion are: primary ammonium ions such as stearyl ammonium ion, hexyl ammonium ion, octyl ammonium ion, 2-ethyl hexyl ammonium ion or the like; secondary ammonium ions such as dodecyl(lauryl) ammonium ion, octadecyl(stearyl) ammonium ion or the like; tertiary ammonium ions such as trioctyl ammonium ion or the like; and quaternary ammonium ions such as dioctyldimethyl ammonium ion, distearyldimethyl ammonium ion or the like. These organic cation may be used alone or as a mixture of at least two of them.

(d) The aliphatic carboxylic acid and/or the salt thereof preferably includes a saturated fatty acid and/or the salt thereof. Preferable examples thereof include caprylic acid (octanoic acid), pelargonic acid (nonanoic acid), capric acid (decanoic acid), lauric acid, myristic acid, palmitic acid, stearic acid, behenic acid, and oleic add, or a potassium salt, magnesium salt, calcium salt, aluminum salt, zinc salt, iron salt, copper salt, nickel salt, or cobalt salt of the above aliphatic carboxylic acids. (d) The aromatic carboxylic acid and/or the salt thereof preferably includes benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenyl carboxylic acid, naphthalene carboxylic acid, anthracene carboxylic acid, furan carboxylic acid, and thenoyl carboxylic acid, or a potassium salt, magnesium salt, calcium salt, aluminum salt, zinc salt, iron salt, copper salt, nickel salt, or cobalt salt of the above aromatic carboxylic acids.

The content of (d) the carboxylic acid and/or the salt thereof is preferably 0.5 part by mass or more, more preferably 1.0 parts by mass or more, even more preferably 1.5 parts by mass or more, and is preferably 30 parts by mass or less, more preferably 20 parts by mass or less, even more preferably 15 parts by mass or less, with respect to 100 parts by mass of (a) the base rubber. If the content of (d) the carboxylic acid and/or the salt thereof is excessively low, the effect of adding (d) the carboxylic acid and/or the salt thereof is not sufficient, and thus the degree of the outer-hard inner-soft structure of the spherical core may be lowered. If the content is excessively high, the resilience of the core may be lowered, since the hardness of the resultant core may be lowered as a whole.

There are cases where the surface of the zinc acrylate used as the co-crosslinking agent is treated with zinc stearate to improve the dispersibility to the rubber. In the case of using zinc acrylate whose surface is treated with zinc stearate, in the present invention, the amount of zinc stearate used as a surface treating agent is included in the content of (d) the carboxylic acid and/or the salt thereof. For example, if 25 parts by mass of zinc acrylate whose surface treatment amount with zinc stearate is 10 mass % is used, the amount of zinc stearate is 2.5 parts by mass and the amount of zinc acrylate is 22.5 parts by mass. Thus, 2.5 parts by mass is counted as the content of (d) the carboxylic acid and/or the salt thereof.

In the case that the rubber composition used in the present invention contains only the α,β-unsaturated carboxylic acid having 3 to 8 carbon atoms as the co-crosslinking agent, the rubber composition further contains (e) the metal compound as an essential component. (e) The metal compound is not limited as long as it can neutralize (b) the α,β-unsaturated carboxylic acid having 3 to 8 carbon atoms in the rubber composition. (e) The metal compound includes, for example, a metal hydroxide such as magnesium hydroxide, zinc hydroxide, calcium hydroxide, sodium hydroxide, lithium hydroxide, potassium hydroxide, copper hydroxide, or the like; a metal oxide such as magnesium oxide, calcium oxide, zinc oxide, copper oxide, or the like; and a metal carbonate such as magnesium carbonate, zinc carbonate, calcium carbonate, sodium carbonate, lithium carbonate, potassium carbonate, or the like. Among these, (e) the metal compound preferably includes a divalent metal compound, more preferably includes a zinc compound. The divalent metal compound reacts with the α,β-unsaturated carboxylic acid having 3 to 8 carbon atoms, thereby forming a metal crosslinking. Use of the zinc compound provides a golf ball with excellent resilience. (e) The metal compound can be used solely or as a mixture of at least two of them. The content of (e) the metal compound may be appropriately determined in accordance with the desired degree of neutralization of (b) the α,β-unsaturated carboxylic acid having 3 to 8 carbon atoms.

The rubber composition used in the present invention preferably further contains (f) an organic sulfur compound. By using (c) the crosslinking initiator, (d) the carboxylic acid and/or the salt thereof and (f) the organic sulfur compound in combination for the rubber composition, the degree of the outer-hard and inner-soft structure of the core can be controlled to a higher extent.

(f) The organic sulfur compound is not particularly limited, as long as it is an organic compound having a sulfur atom in the molecule thereof. Examples thereof include an organic compound having a thiol group (—SH) or a polysulfide bond having 2 to 4 sulfur atoms (—S—S—, —S—S—S—, or —S—S—S—S—), and a metal salt thereof (—SM, —S-M-S—, —S-M-S—S—, —S—S-M-S—S—, —S-M-S—S—S—, or the like; M is a metal atom). Examples of the metal salt include a monovalent metal salt such as sodium, lithium, potassium, copper (I), and silver (I) or the like, and a divalent metal salt such as zinc, magnesium, calcium, strontium, barium, titanium (II), manganese (II), iron (II), cobalt (II), nickel (II), zirconium (II), tin (II) or the like. Furthermore, (f) the organic sulfur compound may be any one of an aliphatic compound (aliphatic thiol, aliphatic thiocarboxylic acid, aliphatic dithiocarboxylic acid, aliphatic polysulfide, or the like), heterocyclic compound, alicyclic compound (alicyclic thiol, alicyclic thiocarboxylic acid, alicyclic dithiocarboxylic acid, alicyclic polysulfide, or the like), and aromatic compound.

(f) The organic sulfur compound includes, for example, thiols (thiophenols and thionaphthols), polysulfides, thiurams, thiocarboxylic acids, dithiocarboxylic acids, sulfenamides, dithiocarbamates, and thiazoles.

Examples of the thiols include, for example, thiophenols and thionaphthols. The thiophenols include, for example, thiophenol; thiophenols substituted with a fluoro group, such as 4-fluorothiophenol, 2,5-difluorothiophenol, 2,6-difluorothiophenol 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol, pentaiodothiophenol and the like; or a metal salt thereof. As the metal salt, a zinc salt is preferred.

Examples of the thionaphthols (naphthalenethiols) are 2-thionaphthol, 1-thionaphthol, 1-chloro-2-thionaphthol 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol 2-cyano-1-thionaphthol, 1-acetyl-2-thionaphthol, 2-acetyl-1-thionaphthol, and a metal salt thereof. Preferable examples include 2-thionaphthol, 1-thionaphthol, or the metal salt thereof. The metal salt is preferably a divalent metal salt, more preferably a zinc salt. Specific examples of the metal salt include, for example, the zinc salt of 1-thionaphthol and the zinc salt of 2-thionaphthol.

The polysulfides are organic sulfur compounds having a polysulfide bond, and include, for example, disulfides, trisulfides, and tetrasulfides. The polysulfides preferably include diphenylpolysulfides.

Examples of the diphenylpolysulfides include: diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl) disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl) disulfide, bis(2,4,5,6-tetrachlorophenyl)disulfide, bis(pentachlorophenyl)disulfide, bis(4-bromophenyl)disulfide, bis (2,5-dibromophenyl)disulfide, bis(2,6-dibromophenyl) disulfide, bis(2,4,5-tribromophenyl)disulfide, bis(2,4,5,6-tetrabromophenyl)disulfide, bis(pentabromophenyl) disulfide, bis(4-iodophenyl)disulfide, bis(2,5-diiodophenyl) disulfide, bis(2,6-diiodophenyl)disulfide, bis(2,4,5-triiodophenyl)disulfide, bis(2,4,5,6-tetraiodophenyl) disulfide, bis(pentaiodophenyl)disulfide; diphenyldisulfides substituted with an alkyl group, such as bis(4-methylphenyl) disulfide, bis(2,4,5-trimethylphenyl)disulfide, bis(pentamethylphenyl)disulfide, bis(4-t-butylphenyl)disulfide, bis(2,4, 5-tri-t-butylphenyl)disulfide, bis(penta-t-butylphenyl) disulfide; and the like.

The thiurams include, for example, thiurammonosulfides such as tetramethylthiurammonosulfide; thiuramdisulfides such as tetramethylthiuram disulfide, tetraethylthiuram disulfide, tetrabutylthiuram disulfide; and thiuramtetrasulfides such as dipentamethylenethiuramtetrasulfide. The thiocarboxylic acids include, for example, a naphthalenethiocarboxylic acid. The dithiocarboxylic acids include, for example, a naphthalenedithiocarboxylic acid. The sulfenamides include, for example, N-cyclohexyl-2-benzothiazole sulfenamide, N-oxydiethylene-2-benzothiazole sulfenamide, and N-t-butyl-2-benzothiazole sulfenamide.

(f) The organic sulfur compound preferably includes thiophenols and/or the metal salt thereof, thionaphthols and/or the metal salt thereof, diphenyldisulfides and thiuramdisulfides, and more preferably 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl) disulfide.

The content of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (f) the organic sulfur compound is less than 0.05 part by mass, the effect of adding (f) the organic sulfur compound cannot be obtained and thus the resilience of the golf ball may not be enhanced. If the content of (f) the organic sulfur compound exceeds 5.0 parts by mass, the compression deformation amount of the obtained golf ball becomes large and thus the resilience may be lowered.

The rubber composition used in the present invention may include an additive such as a pigment, a filler for adjusting weight or the like, an antioxidant, a peptizing agent, and a softener where necessary. Examples of the pigment blended in the rubber composition include a white pigment, a blue pigment, and a purple pigment.

As the white pigment, titanium oxide is preferably used. The type of titanium oxide is not particularly limited, but rutile type is preferably used because of the high opacity. The blending amount of titanium oxide is preferably 0.5 part by mass or more, and more preferably 2 parts by mass or more, and is preferably 8 parts by mass or less, and more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes, for example, an inorganic filler such as zinc oxide, barium sulfate, calcium carbonate, magnesium oxide, tungsten powder, molybdenum powder, or the like. Zinc oxide is preferably used as the filler. It is considered that zinc oxide functions as a vulcanization activator and increases the hardness of the entire core. The content of the filler is preferably 0.5 part by mass or more, more preferably 1 part by mass or more, and is preferably 30 parts by mass or less, more preferably 25 parts by mass or less, even more preferably 20 parts by mass or less, with respect to 100 parts by mass of the base rubber. If the content of the filler is less than 0.5 part by mass, it is difficult to adjust the weight, while if the content of the filler exceeds 30 parts by mass, the weight ratio of the rubber component is reduced and thus the resilience tends to be lowered.

The blending amount of the antioxidant is preferably 0.1 part by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

The cover composition used in the present invention contains a resin component. Examples of the resin component include, for example, an ionomer resin; a thermoplastic polyurethane elastomer having a commercial name of "Elastollan (registered trademark)" commercially available from BASF Japan Ltd; a thermoplastic polyamide elastomer having a commercial name of "Pebax (registered trademark)" commercially available from Arkema K. K.; a thermoplastic polyester elastomer having a commercial name of "Hytrel (registered trademark)" commercially available from Du Pont-Toray Co., Ltd.; and a thermoplastic styrene elastomer having a commercial name of "Rabalon (registered trademark)" commercially available from Mitsubishi Chemical Corporation; and the like.

The ionomer resin includes a product prepared by neutralizing at least a part of carboxyl groups in a binary copolymer composed of an olefin and an $\alpha,\beta$-unsaturated carboxylic acid having 3 to 8 carbon atoms with a metal ion, a product prepared by neutralizing at least a part of carboxyl groups in a ternary copolymer composed of an olefin, an $\alpha,\beta$-unsaturated carboxylic acid having 3 to 8 carbon atoms and an $\alpha,\beta$-unsaturated carboxylic acid ester with a metal ion, or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the $\alpha,\beta$-unsaturated carboxylic add having 3 to 8 carbon atoms are acrylic acid, methacrylic acid, fumaric acid, maleic acid and crotonic acid. Among these, acrylic acid and methacrylic acid are particularly preferred. Examples of the $\alpha,\beta$-unsaturated carboxylic acid ester include methyl ester, ethyl ester, propyl ester, n-butyl ester, isobutyl ester of acrylic acid, methacrylic acid, fumaric acid, maleic add or the like. In particular, acrylic acid ester and methacrylic acid ester are preferable. Among these, the ionomer resin preferably includes a metal ion-neutralized product of a binary copolymer composed of ethylene-(meth) acrylic acid and a metal ion-neutralized product of a ternary copolymer composed of ethylene-(meth)acrylic acid-(meth) acrylic acid ester.

Specific examples of the ionomer resin include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples of the ionomer resin also include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8120 (Na), Surlyn 8320 (Na), Surlyn 9320 (Zn), Surlyn 6320 (Mg), HPF 1000 (Mg), HPF 2000 (Mg)" commercially available from E.I. du Pont de Nemours and Company.

Further, examples of the ionomer resin also include Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn)) commercially available from ExxonMobil Chemical Corporation.

It is noted that Na, Zn, Li, and Mg described in the parentheses after the trade names indicate metal ion type for neutralizing the ionomer resin. The ionomer resin may be used solely or in combination at least two of them.

The cover composition preferably includes, as a resin component, a thermoplastic polyurethane elastomer or an ionomer resin. In case of using the ionomer resin, it is preferred to use a thermoplastic styrene elastomer together. The content of the polyurethane or ionomer resin in the resin component of the cover composition is preferably 50 mass % or more, more preferably 60 mass % or more, and even more preferably 70 mass % or more.

In the present invention, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the performance of the cover.

The content of the white pigment (for example, titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the content of the white pigment is 0.5 part by mass or more, it is possible to impart the opacity to the resultant cover. Further, if the content of the white pigment is more than 10 parts by mass, the durability of the resultant cover may deteriorate.

The method for manufacturing the golf ball of the present invention will be explained below.

The rubber composition used in the present invention is obtained by mixing and kneading (a) the base rubber, (b) the α,β-unsaturated carboxylic acid having 3 to 8 carbon atoms and/or the metal salt thereof, (c) the crosslinking initiator, and (d) the carboxylic acid and/or the salt thereof, and other additives where necessary. The kneading can be conducted, without any limitation, with a well-known kneading machine such as a kneading roll, a banbury mixer, a kneader, or the like.

The spherical core of the golf ball of the present invention can be obtained by heat pressing the rubber composition after kneaded. The temperature for heat pressing is preferably 120° C. or more, more preferably 130° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

The heat press temperature is preferably t-40° C. or more, more preferably t-38° C. or more, even more preferably t-36° C. or more, and is preferably t-15° C. or less, more preferably t-17° C. or less, even more preferably t-19° C. or less, wherein t ° C. is defined as the one-minute half-life temperature of (c) the crosslinking initiator. If the heat press temperature is t-40° C. or more, the degree of the outer-hard and inner-soft structure of the core can be enhanced, and if the heat press temperature is t-15° C. or less, the core having the hardness distribution prescribed in the present invention can be obtained, thus the effect of lowering the spin rate on driver shots is enhanced. In the case of blending two or more kinds of (c) the crosslinking initiator in the rubber composition, the heat press temperature may be adjusted to satisfy the above range relative to one-minute half-life temperatures of all of (c) the crosslinking initiators.

An embodiment for molding the cover is not particularly limited, and includes an embodiment which comprises injection-molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression-molding method, molding of the half shell can be performed by either compression-molding method or injection-molding method, but the compression-molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include a method of covering the core with two half shells and then subjecting the core with the two half shells to the compression-molding. The compression-molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of injection-molding the cover composition, the cover composition extruded in a pellet form beforehand may be used for injection-molding, or the materials such as the base resin components and the pigment may be dry blended, followed by directly injection-molding the blended material. It is preferred to use upper and lower molds having a spherical cavity and pimples for forming the cover, wherein a part of the pimples also serves as a retractable hold pin. When molding the cover by injection-molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened and the golf ball with the cover molded is ejected from the mold.

After the cover is molded, the mold is opened and the golf ball body is ejected from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 50 μm or smaller, and more preferably 40 μm or smaller, even more preferably 30 μm or smaller. If the thickness is smaller than 5 μm, the paint film is easy to wear off due to continued use of the golf ball, and if the thickness is larger than 50 μm, the effect of the dimples is reduced, resulting in lowering flying performance of the golf ball.

EXAMPLES

Hereinafter, the present invention will be described in detail by way of example. The present invention is not limited to examples described below. Various changes and modifications can be made without departing from the spirit and scope of the present invention.
[Evaluation Methods]
(1) Compression Deformation Amount (mm)

A compression deformation amount of the core or golf ball (a shrinking amount of the core or golf ball in the compression direction thereof), when applying a load from an initial load of 98 N to a final load of 1275 N to the core or golf ball, was measured.
(2) Slab Hardness (Shore D Hardness)

Sheets with a thickness of about 2 mm were produced by injection-molding the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-02240.

(3) Hardness Distribution of Spherical Core (JIS-C Hardness)

A type P1 auto loading durometer manufactured by Kobunshi Keiki Co., Ltd., provided with a JIS-C type spring hardness tester was used to measure the hardness of the spherical core. The hardness measured at the surface of the spherical core was adopted as the surface hardness of the spherical core. The spherical core was cut into two hemispheres to obtain a cut plane, and the hardness was measured at the central point and at predetermined distances from the central point. The core hardness was measured at 4 points at predetermined distances from the central point of the cut plane of the core. The core hardness was calculated by averaging the hardness measured at the 4 points.
(4) Flight Distance (m) and Spin Rate (rpm) on Driver Shots A metal-headed W#1 driver (XXIO, Shaft: S, loft: 11°, manufactured by Dunlop Sports Limited) was installed on a swing robot M/C manufactured by Golf Laboratories, Inc. A golf ball was hit at a head speed of 40 m/sec, and the spin rate right after hitting the golf ball and the flight distance (the distance from the launch point to the stop point) were measured. This measurement was conducted twelve times for each golf ball, and the average value thereof was adopted as the measurement value for the golf ball. A sequence of photographs of the hit golf ball were taken for measuring the spin rate (rpm) right after hitting the golf ball. The flight distance and spin rate of the golf ball on driver shots are shown as a difference from those of the golf ball No. 5 for the golf balls No. 1 to No. 4, No. 6 to No. 9, and are shown as a difference from those of the golf ball No. 21 for the golf balls No. 10 to No. 20, and No. 22.
[Production of Golf Ball]
(1) Production of Core The rubber compositions having formulations shown in Tables 1 to 3 were kneaded with a kneading roll and extruded with an extruder to prepare plugs. The obtained plugs were heat pressed in upper and lower molds, each having a hemispherical cavity, for 20 minutes to prepare spherical cores having a diameter of 39.8 mm. The heat pressing was performed at temperatures shown in Tables 1 to 3.

TABLE 1

| | | | Golf ball No. | | | | | | |
|---|---|---|---|---|---|---|---|---|---|
| | | | 1 | 2 | 3 | 4 | 5 | 6 | 7 |
| Core | Rubber composition (part by mass) | BR730 | 100 | 100 | 100 | 100 | 100 | 100 | 100 |
| | | Sanceler SR | 29 | 29 | 29 | 31 | 23 | 27 | 27 |
| | | 2-Thionaphthol | 0.2 | 0.2 | 0.2 | — | — | 0.1 | 0.2 |
| | | PBDS | — | — | — | 0.63 | — | — | — |
| | | 2,6-DCTP | — | — | — | — | — | — | — |
| | | Zinc octanoate | 7.5 | — | — | — | — | — | — |
| | | Benzoic acid | — | 5 | — | 5 | — | — | — |
| | | Zinc dibenzoate | — | — | — | — | — | — | — |
| | | 4-Dimethylaminobenzoic acid | — | — | 5 | — | — | — | — |
| | | Zinc oxide | 5 | 5 | 5 | 5 | 5 | 5 | 5 |
| | | Barium sulfate | *1) | *1) | *1) | *1) | *1) | *1) | *1) |
| | | PERCUMYL D | — | — | — | — | 0.8 | 0.8 | — |
| | | PERHEXYNE 25B | 0.49 | 0.49 | 0.49 | 0.49 | — | — | 0.49 |
| | | PERHEXA 25B | — | — | — | — | — | — | — |
| | | PERBUTYL P | — | — | — | — | — | — | — |
| | | PERHEXA C-40 | — | — | — | — | — | — | — |
| | | PERHEXA HC | — | — | — | — | — | — | — |
| | Press temperature (° C.) | | 170 | 170 | 170 | 170 | 170 | 170 | 170 |
| | Core hardness distribution (JIS-C) | Center hardness | 45.1 | 46.2 | 47.1 | 45.2 | 56.8 | 56.2 | 54.5 |
| | | 12.5% point hardness | 50.3 | 50.2 | 50.1 | 48.6 | 60.7 | 62.7 | 60.4 |
| | | 25% point hardness | 54.3 | 54.0 | 53.1 | 52.1 | 64.5 | 67.1 | 63.3 |
| | | 37.5% point hardness | 56.5 | 56.3 | 56.3 | 54.4 | 66.5 | 68.3 | 64.2 |
| | | 50% point hardness | 62.0 | 61.3 | 62.2 | 57.3 | 67.2 | 68.5 | 65.6 |
| | | 62.5% point hardness | 69.3 | 70.6 | 69.5 | 66.2 | 67.6 | 68.2 | 70.2 |

TABLE 1-continued

|  |  |  | Golf ball No. | | | | | | |
| --- | --- | --- | --- | --- | --- | --- | --- | --- | --- |
|  |  |  | 1 | 2 | 3 | 4 | 5 | 6 | 7 |
|  |  | 75% point hardness | 70.6 | 77.7 | 74.1 | 78.8 | 71.3 | 71.6 | 73.8 |
|  |  | 87.5% point hardness | 69.5 | 77.1 | 73.0 | 80.5 | 72.1 | 75.4 | 73.0 |
|  |  | Surface hardness | 70.0 | 75.7 | 73.3 | 80.1 | 80.6 | 83.9 | 73.5 |
|  |  | Surface hardness – center hardness | 24.9 | 29.5 | 26.2 | 34.9 | 23.8 | 27.7 | 19.0 |
|  |  | $(H_{37.5} - H_0)/(H_{75.0} - H_0)$ | 0.45 | 0.32 | 0.34 | 0.27 | 0.67 | 0.79 | 0.50 |
|  | Compression deformation amount (D) (mm) |  | 4.20 | 4.04 | 4.15 | 4.21 | 4.09 | 4.06 | 4.17 |
|  | $-9 \times D + 95$ |  | 57.2 | 58.6 | 57.7 | 57.1 | 58.2 | 58.5 | 57.4 |
| Cover | Type |  | A | A | A | A | A | A | A |
|  | Slab hardness (Shore D) |  | 65 | 65 | 65 | 65 | 65 | 65 | 65 |
|  | Thickness(mm) |  | 1.5 | 1.5 | 1.5 | 1.5 | 1.5 | 1.5 | 1.5 |
| Golf Ball | Driver spin rate (rpm) |  | −100 | −120 | −90 | −120 | 0 | 0 | 0 |
|  | Driver flight distance (m) |  | 2.8 | 3.5 | 3.0 | 3.8 | 0 | 0.7 | 0 |
|  | Compression deformation amount (mm) |  | 3.50 | 3.34 | 3.45 | 3.51 | 3.39 | 3.23 | 3.47 |

*1) As to an amount of barium sulfate, adjustment was made such that the golf ball had a mass of 45.4 g.

TABLE 2

|  |  |  | Golf ball No. | | | | | | | |
| --- | --- | --- | --- | --- | --- | --- | --- | --- | --- | --- |
|  |  |  | 8 | 9 | 10 | 11 | 12 | 13 | 14 | 15 |
| Core | Rubber composition | BR730 | 100 | 100 | 100 | 100 | 100 | 100 | 100 | 100 |
|  | (part by mass) | Sanceler SR | 33 | 35 | 29 | 36 | 37 | 40 | 36 | 34 |
|  |  | 2-Thionaphthol | 0.32 | 0.2 | 0.1 | 0.1 | 0.1 | — | — | 0.2 |
|  |  | PBDS | — | — | — | — | — | — | 0.63 | — |
|  |  | 2,6-DCTP | — | — | — | — | — | 0.22 | — | — |
|  |  | Zinc octanoate | 5 | — | 5 | 7.5 | — | — | — | — |
|  |  | Benzoic acid | — | 5 | — | — | 5.2 | 5.2 | — | — |
|  |  | Zinc dibenzoate | — | — | — | — | — | — | 6.5 | — |
|  |  | 4-Dimethylaminobenzoic acid | — | — | — | — | — | — | — | — |
|  |  | 4-Chlorobenzoic acid | — | — | — | — | — | — | — | 6.7 |
|  |  | Zinc oxide | 5 | 5 | 5 | 5 | 5 | 5 | 5 | 15 |
|  |  | Barium sulfate | *1) | *1) | *1) | *1) | *1) | *1) | *1) | *1) |
|  |  | PERCUMYL D | 0.8 | 0.8 | — | — | — | — | — | — |
|  |  | PERHEXYNE 25B | — | — | 0.49 | 0.49 | 0.49 | 0.49 | 0.49 | 0.49 |
|  |  | PERHEXA 25B | — | — | — | — | — | — | — | — |
|  |  | PERBUTYL P | — | — | — | — | — | — | — | — |
|  |  | PERHEXA HC | — | — | — | — | — | — | — | — |
|  | Press temperature (°C.) |  | 170 | 170 | 170 | 170 | 170 | 170 | 170 | 170 |
|  | Core hardness distribution | Center hardness | 51.6 | 43.6 | 50.8 | 51.1 | 50.4 | 51.2 | 47.4 | 52.0 |
|  | (JIS-C) | 12.5% point hardness | 58.2 | 48.7 | 56.1 | 56.3 | 54.2 | 55.2 | 52.3 | 55.2 |
|  |  | 25% point hardness | 61.9 | 55.0 | 61.1 | 60.3 | 58.3 | 59.7 | 56.7 | 58.6 |
|  |  | 37.5% point hardness | 64.5 | 58.8 | 64.0 | 62.5 | 59.9 | 61.7 | 59.5 | 61.6 |
|  |  | 50% point hardness | 66.5 | 61.3 | 69.4 | 68.0 | 62.2 | 62.4 | 60.6 | 69.3 |
|  |  | 62.5% point hardness | 72.5 | 61.4 | 75.7 | 75.3 | 71.5 | 67.4 | 70.8 | 76.9 |
|  |  | 75% point hardness | 79.1 | 72.6 | 78.5 | 80.2 | 81.7 | 80.3 | 82.7 | 80.7 |
|  |  | 87.5% point hardness | 82.5 | 80.2 | 75.9 | 79.3 | 82.5 | 87.5 | 82.6 | 79.3 |
|  |  | Surface hardness | 85.6 | 87.1 | 80.1 | 83.5 | 86.7 | 89.4 | 83.6 | 81.4 |
|  |  | Surface hardness – center hardness | 34.0 | 43.5 | 29.3 | 32.4 | 36.3 | 38.2 | 36.2 | 29.4 |
|  |  | $(H_{37.5} - H_0)/(H_{75.0} - H_0)$ | 0.47 | 0.52 | 0.48 | 0.39 | 0.30 | 0.36 | 0.34 | 0.34 |
|  | Compression deformation amount (D) (mm) |  | 4.08 | 4.30 | 3.34 | 3.10 | 3.15 | 3.27 | 3.16 | 3.44 |
|  | $-9 \times D + 95$ |  | 58.3 | 56.3 | 64.9 | 67.1 | 66.7 | 65.6 | 66.6 | 64.0 |
| Cover | Type |  | A | A | B | B | B | B | B | B |
|  | Slab hardness (Shore D) |  | 65 | 65 | 47 | 47 | 47 | 47 | 47 | 47 |
|  | Thickness(mm) |  | 1.5 | 1.5 | 1.5 | 1.5 | 1.5 | 1.5 | 1.5 | 1.5 |
| Golf Ball | Driver spin rate (rpm) |  | −40 | −30 | −90 | −100 | −120 | −120 | −110 | −60 |
|  | Driver flight distance (m) |  | 1.2 | 1.0 | 3.5 | 3.1 | 3.5 | 3.8 | 3.7 | 2.5 |
|  | Compression deformation amount (mm) |  | 3.38 | 3.60 | 3.14 | 2.90 | 2.95 | 3.07 | 2.96 | 3.24 |

*1) As to an amount of barium sulfate, adjustment was made such that the golf ball had a mass of 45.4 g.

TABLE 3

| | | | Golf ball No. | | | | | | |
|---|---|---|---|---|---|---|---|---|---|
| | | | 16 | 17 | 18 | 19 | 20 | 21 | 22 |
| Core | Rubber composition (part by mass) | BR730 | 100 | 100 | 100 | 100 | 100 | 100 | 100 |
| | | Sanceler SR | 34 | 28 | 29 | 31 | 31 | 29 | 28 |
| | | 2-Thionaphthol | 0.1 | 0.1 | 0.1 | 0.1 | 0.1 | — | 0.1 |
| | | PBDS | — | — | — | — | — | — | — |
| | | 2,6-DCTP | — | — | — | — | — | — | — |
| | | Zinc octanoate | — | — | — | — | — | — | — |
| | | Benzoic acid | 5.2 | 5.2 | 5.2 | 5.2 | 5.2 | — | 5.2 |
| | | Zinc dibenzoate | — | — | — | — | — | — | — |
| | | 4-Dimethylaminobenzoic acid | — | — | — | — | — | — | — |
| | | Zinc oxide | 5 | 5 | 5 | 5 | 5 | 5 | 5 |
| | | Barium sulfate | *1) | *1) | *1) | *1) | *1) | *1) | *1) |
| | | PERCUMYL D | 0.8 | — | — | — | — | 0.8 | 0.8 |
| | | PERHEXYNE 25B | — | — | — | — | — | — | — |
| | | PERHEXA 25B | — | 0.5 | — | — | — | — | — |
| | | PERBUTYL P | — | — | 0.63 | — | — | — | — |
| | | PERHEXA C-40 | — | — | — | 0.87 | — | — | — |
| | | PERHEXA HC | — | — | — | — | 0.6 | — | — |
| | Press temperature (° C.) | | 150 | 150 | 150 | 130 | 130 | 170 | 170 |
| | Core hardness distribution (JIS-C) | Center hardness | 45.6 | 47.2 | 48.2 | 48.1 | 47.8 | 65.9 | 62.1 |
| | | 12.5% point hardness | 51.7 | 54.1 | 53.8 | 54.0 | 55.6 | 70.0 | 64.4 |
| | | 25% point hardness | 57.1 | 57.8 | 57.5 | 59.6 | 61.9 | 73.1 | 68.0 |
| | | 37.5% point hardness | 59.5 | 60.5 | 59.6 | 63.8 | 64.2 | 74.1 | 72.1 |
| | | 50% point hardness | 61.1 | 65.7 | 63.3 | 68.8 | 66.5 | 74.3 | 74.3 |
| | | 62.5% point hardness | 66.6 | 77.8 | 74.0 | 74.3 | 72.4 | 73.6 | 74.6 |
| | | 75% point hardness | 80.8 | 81.2 | 82.2 | 77.7 | 78.0 | 75.6 | 74.8 |
| | | 87.5% point hardness | 84.3 | 80.2 | 82.7 | 77.5 | 79.5 | 78.8 | 74.1 |
| | | Surface hardness | 90.8 | 84.9 | 86.5 | 83.1 | 84.5 | 85.0 | 73.1 |
| | | Surface hardness − center hardness | 45.2 | 37.7 | 38.3 | 35.0 | 36.7 | 19.1 | 11.1 |
| | | $(H_{37.5} - H_o)/(H_{75.0} - H_o)$ | 0.39 | 0.39 | 0.34 | 0.53 | 0.54 | 0.85 | 0.79 |
| | Compression deformation amount (D) (mm) | | 3.08 | 3.33 | 3.24 | 2.95 | 3.29 | 3.29 | 3.21 |
| | −9 × D + 95 | | 67.3 | 65.0 | 65.9 | 68.5 | 65.4 | 65.4 | 66.1 |
| Cover | Type | | B | B | B | B | B | B | B |
| | Slab hardness (Shore D) | | 47 | 47 | 47 | 47 | 47 | 47 | 47 |
| | Thickness(mm) | | 1.5 | 1.5 | 1.5 | 1.5 | 1.5 | 1.5 | 1.5 |
| Golf Ball | Driver spin rate (rpm) | | −100 | −80 | −70 | −50 | −60 | 0 | −30 |
| | Driver flight distance (m) | | 3.1 | 2.9 | 2.6 | 2.4 | 2.1 | 0 | 1.2 |
| | Compression deformation amount (mm) | | 2.88 | 3.13 | 3.04 | 2.75 | 3.09 | 3.09 | 3.01 |

*1) As to an amount of barium sulfate, adjustment was made such that the golf ball had a mass of 45.4 g.
BR730: a high-cispolybutadiene (cis-1,4 bond content = 96 mass %, 1,2-vinyl bond content = 1.3 mass %, Moony viscosity (ML$_{1+4}$ (100° C.) = 55, molecular weight distribution (Mw/Mn) = 3) available from JSR Corporation
Sanceler SR: zinc acrylate (product of 10 mass % stearic acid coating) available from Sanshin Chemical Industry Co., Ltd.
2-Thionaphthol: available from Tokyo Chemical Industry Co., Ltd.
PBDS: bis(pentabromophenyl) disulfide 2,6-DCTP: 2,6-dichlorothiophenol
Zinc octanoate: available from Mitsuwa Chemicals Co., Ltd. (purity 99 mass % or more)
Benzoic acid: available from Sigma-Aldrich Co., Ltd. (purity 99.5 mass % or more)
Zinc dibenzoate: available from Wako Pure Chemical Industries, Ltd. (purity 95 mass % or more)
4-Dimethylaminobenzoic acid: available from Tokyo Chemical Industry Co., Ltd. (purity 98 mass % or more)
4-Chlorobenzoic acid: available from Tokyo Chemical Industry Co., Ltd. (purity 99 mass % or more)
Zinc oxide: "Ginrei R" manufactured by Toho Zinc Co., Ltd.
Barium sulfate: "Barium sulfate BD" manufactured by Sakai Chemical Industry Co., Ltd., adjustment was made such that the finally obtained golf ball had a mass of 45.4 g.
Dicumyl peroxide: "PERCUMYL ® D" (one-minute half-life temperature = 175.2° C.) available from NOF Corporation.
2,5-Dimethyl-2,5-bis(t-butylperoxy)hexyne-3: "PERHEXYNE ® 25B" (one-minute half-life temperature = 194.3° C.) available from NOF Corporation.
2,5-Dimethyl-2,5-bis(t-butylperoxy)hexane: "PERHEXA ® 25B" (one-minute half-life temperature = 179.8° C.) available from NOF Corporation.
Di(2-t-butylperoxyisopropyl)benzene: "PERBUTYL ® P" (one-minute half-life temperature = 175.4° C.) available from NOF Corporation.
1,1-Di(t-butylperoxy)cyclohexane: "PERHEXA C-40" (one-minute half-life temperature = 153.8° C.) available from NOF Corporation.
1,1-Di(t-hexylperoxy)cyclohexane: "PERHEXA HC" (one-minute half-life temperature = 149.2° C.) available from NOF Corporation.

(2) Production of Cover

Cover materials shown in Table 4 were extruded with a twin-screw kneading extruder to prepare the cover compositions in the pellet form. The extruding conditions of the cover compositions were a screw diameter of 45 mm, a screw rotational speed of 200 rpm, and screw L/D=35, and the mixtures were heated to 150 to 230° C. at the die position of the extruder. The obtained cover compositions were injection-molded onto the spherical core obtained above to produce the golf ball comprising the spherical core and the cover covering the spherical core.

TABLE 4

| | | Cover composition | |
|---|---|---|---|
| | | A | B |
| Formulation | Himilan 1605 | 50 | — |
| | Himilan 1706 | 50 | — |
| | Elastollan XNY97A | — | 100 |
| | Titanium oxide | 4 | 4 |
| Slab hardness (Shore D) | | 65 | 47 |

Formulation: Parts by Mass
Himilan 1605: Sodium ion neutralized ethylene-methacrylic acid copolymer ionomer resin available from Du Pont-Mitsui Polychemicals Co., Ltd
Himilan 1706: Zinc ion neutralized ethylene-methacrylic acid copolymer ionomer resin available from Du Pont-Mitsui Polychemicals Co., Ltd
Elastollan XNY97A: Thermoplastic polyurethane elastomer available from BASF Japan Ltd.

Evaluation results of the golf balls are shown in Tables 1 to 3. The spherical cores of the golf balls No. 1 to No. 4 and No. 10 to No. 20 have a hardness distribution satisfying the requirements (I) to (III). All of these golf balls have a lowered spin rate on driver shots and an enhanced flight distance.

The golf ball of the present invention has a lowered spin rate on the driver shots and an excellent flight performance. This application is based on Japanese Patent applications No. 2013-115473 filed on May 31, 2013, and No. 2014-039187 filed on Feb. 28, 2014, the content of which are hereby incorporated by reference.

The invention claimed is:

1. A golf ball comprising a spherical core and at least one cover layer covering the spherical core, wherein the spherical core is formed from a rubber composition containing
   (a) a base rubber,
   (b) an α,β-unsaturated carboxylic acid having 3 to 8 carbon atoms and/or a metal salt thereof as a co-crosslinking agent,
   (c) a crosslinking initiator including 2,5-dimethyl-2,5-di(t-butylperoxy)hexyne-3, and
   (d) a carboxylic acid and/or a salt thereof, excluding an α,β-unsaturated carboxylic acid having 3 to 8 carbon atoms and a metal salt thereof,
   a content of (c) the crosslinking initiator is 0.2 part to 0.8 part by mass with respect to 100 parts by mass of (a) the base rubber,
   the spherical core has a diameter in a range from 34.8 mm to 42.2 mm and a compression deformation amount in a range from 2.8 mm to 6.0 mm when applying a load from 98N as an initial load to 1275N as a final load to the spherical core, and
   when JIS-C hardness of the spherical core is measured at points located at distances of 0% (core center), 37.5%, 75.0% and 100% (core surface) from the core center of the spherical core,
   a hardness difference (Hs−Ho) between a surface hardness (Hs) thereof and a center hardness (Ho) thereof is 28 or more,
   a ratio $((H_{37.5}-Ho)/(H_{75.0}-Ho))$ of a hardness difference $(H_{37.5}-Ho)$ between a 37.5% point hardness $(H_{37.5})$ and a center hardness (Ho) to a hardness difference $(H_{75.0}-Ho)$ between a 75.0% point hardness $(H_{75.0})$ and a center hardness (Ho) is 0.39 or less, and
   the compression deformation amount (D (mm)) of the spherical core and the 37.5% point hardness $(H_{37.5})$ satisfy a relation of $H_{37.5} \leq -9 \times D + 95$.

2. The golf ball according to claim 1, wherein the rubber composition contains (d) the carboxylic acid and/or the salt thereof in an amount ranging from 0.5 part to 30 parts by mass with respect to 100 parts by mass of (a) the base rubber.

3. The golf ball according to claim 1, wherein the rubber composition further contains (f) an organic sulfur compound.

4. The golf ball according to claim 3, wherein (f) the organic sulfur compound includes at least one compound selected from the group consisting of thiophenols and/or metal salts thereof, thionaphthols and/or metal salts thereof, diphenylpolysulfides and thiuramdisulfides.

5. The golf ball according to claim 1, wherein the rubber composition contains (b) the metal salt of the α,β-unsaturated carboxylic acid having 3 to 8 carbon atoms as (b) the co-crosslinking agent.

6. The golf ball according to claim 1, wherein the ratio $((H_{37.5}-Ho)/(H_{75.0}-Ho))$ is 0.36 or less in JIS-C hardness.

7. The golf ball according to claim 1, wherein the hardness difference (Hs−Ho) is 29.3 or more in JIS-C hardness.

8. The golf ball according to claim 6, wherein the hardness difference (Hs−Ho) is 29.3 or more in JIS-C hardness.

9. The golf ball according to claim 1, wherein component (d) is an aliphatic carboxylic acid having 1 to 11 carbon atoms and/or a salt thereof and/or an aromatic carboxylic acid and/or a salt thereof.

10. The golf ball according to claim 1, wherein the compression deformation amount of the spherical core is in a range from 3.08 mm to 6.0 mm.

11. The golf ball according to claim 1, wherein the compression deformation amount of the spherical core is in a range from 3.08 mm to 6.0 mm, and the hardness difference (Hs−Ho) is 29.3 or more in JIS-C hardness.

12. The golf ball according to claim 1, wherein (d) the carboxylic acid and/or a salt thereof includes an aromatic carboxylic acid and/or a salt thereof.

13. The golf ball according to claim 1, wherein (c) the crosslinking initiator includes 2,5-dimethyl-2,5-di(t-butylperoxy)hexyne-3,
   a content of (c) the crosslinking initiator is 0.2 part to 0.8 part by mass with respect to 100 parts by mass of (a) the base rubber,
   (d) the carboxylic acid and/or a salt thereof includes an aromatic carboxylic acid and/or a salt thereof,
   the compression deformation amount of the spherical core is in a range from 3.08 mm to 6.0 mm, and
   the hardness difference (Hs−Ho) is 29.3 or more in JIS-C hardness.

* * * * *